US010724840B2

(12) United States Patent
Noda et al.

(10) Patent No.: US 10,724,840 B2
(45) Date of Patent: Jul. 28, 2020

(54) CONTROL METHOD OF SHAPE MEASURING APPARATUS

(71) Applicant: MITUTOYO CORPORATION, Kanagawa (JP)

(72) Inventors: Takashi Noda, Tochigi (JP); Hiromi Deguchi, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 332 days.

(21) Appl. No.: 15/819,274

(22) Filed: Nov. 21, 2017

(65) Prior Publication Data

US 2018/0149458 A1 May 31, 2018

(30) Foreign Application Priority Data

Nov. 29, 2016 (JP) ................................. 2016-231064

(51) Int. Cl.
*G01B 5/008* (2006.01)
*G01B 21/04* (2006.01)
*G05B 19/401* (2006.01)
*G05B 19/04* (2006.01)

(52) U.S. Cl.
CPC ............. *G01B 5/008* (2013.01); *G01B 21/04* (2013.01); *G05B 19/041* (2013.01); *G05B 19/401* (2013.01)

(58) Field of Classification Search
CPC .............................. G05B 19/041; G05B 5/008
See application file for complete search history.

(56) References Cited

U.S. PATENT DOCUMENTS

| 7,643,963 | B2 | 1/2010 | Noda et al. | |
|---|---|---|---|---|
| 9,298,178 | B2 | 3/2016 | Noda et al. | |
| 9,448,052 | B2 | 9/2016 | Noda et al. | |
| 2002/0180470 | A1* | 12/2002 | Yoda | G01B 7/012 33/558 |
| 2008/0236260 | A1* | 10/2008 | Noda | G01B 5/008 73/105 |
| 2013/0310962 | A1* | 11/2013 | Noda | G01B 21/04 700/97 |
| 2014/0025336 | A1 | 1/2014 | Noda et al. | |

FOREIGN PATENT DOCUMENTS

| JP | 2008-241420 A | 10/2008 |
|---|---|---|
| JP | 2013-238573 A | 11/2013 |
| JP | 2014-021004 A | 2/2014 |

* cited by examiner

*Primary Examiner* — Michael J Dalbo
(74) *Attorney, Agent, or Firm* — Greenblum & Bernstein, P.L.C.

(57) ABSTRACT

A scanning path is divided after every predetermined number of segments and a set of measurement commands is defined for each of the predetermined number of segments. While executing the measurement command, a speed pattern plan is created for the following measurement command. At this time, planning is conducted such that a final speed of a speed pattern plan of the measurement command is the same as an initial speed of the speed pattern plan of the following measurement command. While executing the measurement command, a gap time (from a current time to an estimated end time of the measurement command) is calculated continuously. When the gap time is longer than a planning calculation time, the initial speed of the speed pattern plan of the following measurement command is kept the same as the final speed of the speed pattern plan of the measurement command.

4 Claims, 20 Drawing Sheets

CONTROL METHOD OF SHAPE MEASURING APPARATUS

CROSS-REFERENCE TO RELATED APPLICATIONS

The present application claims priority under 35 U.S.C. § 119 of Japanese Application No. 2016-231064, filed on Nov. 29, 2016, the disclosure of which is expressly incorporated by reference herein in its entirety.

BACKGROUND OF THE INVENTION

1. Field of the Invention

The present invention relates to a control method of a shape measuring apparatus.

2. Description of Related Art

Shape measuring apparatuses measuring a shape of a measured object by performing a scanning displacement of a stylus tip along a surface of the measured object are known (see, for example, Japanese Patent Laid-open Publication Nos. 2008-241420, 2013-238573, and 2014-21004). For the scanning measurement, a path for a scanning measurement should be generated. The apparatus described in Japanese Patent Laid-open Publication No. 2008-241420 converts design values based on CAD data or the like (for example, NURBS (Non-Uniform Rational B-Spline) data) into polynomial curves of a predetermined degree.

A simple description of the procedure is given. First, CAD data (such as NURBS data) containing path information is received from an external CAD system or the like and the CAD data is converted to point group data. The data for each point is data combining coordinate values (x, y, z) and normal directions (P, Q, R) (in other words, (x, y, z, P, Q, R)). In the present specification, to facilitate the description that follows, point group data containing information for (x, y, z, P, Q, R) is referred to as contour point data.

Next, the coordinate values of each point are offset by a predetermined amount in the normal directions. (Specifically, the predetermined amount is defined as a stylus tip radius r–a standard deflection amount E0.) The point group data found in this way is referred to as offset contour point data.

Then, the offset contour point data is converted into polynomial curves of the predetermined degree. In this example, a cubic function is used as the polynomial, yielding PCC curves (Parametric Cubic Curves). Based on the PCC curves, a path for measuring a work piece is generated. Further, the PCC curves are divided to form divided PCC curves.

By calculating a speed curve from the divided PCC curves, a displacement speed (displacement vector) of a probe is calculated. (For example, the displacement speed (displacement vector) of the probe is defined based on a curvature and the like for each segment of the divided PCC curves.) The probe is displaced based on the displacement speed calculated in this way, and the stylus tip is displaced scanning the surface of the measured object (passive nominal scanning measurement).

Furthermore, a method of taking scanning measurement during a track correction is also known in which a depression correction vector is calculated continuously so as to keep an amount of depression of the probe constant (Japanese Patent Laid-open Publication No. 2013-238573). In this example, such nominal scanning is referred to as an "active nominal scanning measurement."

The "active nominal scanning measurement" disclosed in Japanese Patent Laid-open Publication No. 2013-238573 is described simply. In the "active nominal scanning measurement," a composite vector V expressed in the following (Formula 1) is treated as a displacement command for a probe. When the probe is displaced based on the composite vector V, the probe (stylus tip) displaces along the PCC curve and performs a measurement scanning the surface of the work piece (in other words, the "active nominal scanning measurement") having the constant deflection amount.

$$V = Gf \times Vf + Ge \times Ve + Gc \times Vc \quad \text{(Formula 1)}$$

A simple description of the formula is provided with reference to FIG. 1. In FIG. 1, the PCC curve (that is, the scanning path) lies at a point offset by the predetermined amount (stylus tip radius r–standard deflection amount E0) from the design data (contour point data). Moreover, in FIG. 1, an actual work piece is slightly shifted from the design data.

A vector Vf is a path speed vector. The path speed vector Vf is oriented in a direction that passes from an interpolation point (i) toward a next interpolation point (i+1) on the PCC curve. The magnitude of the path speed vector Vf is determined, for example, based on the curvature of the PCC curve at the interpolation point (i) (see Japanese Patent Laid-open Publication No. 2014-21004, for example).

A vector Ve is a deflection correction vector and sets a deflection amount Ep of the probe to be the predetermined standard deflection amount E0 (0.3 mm for example). (The deflection correction vector Ve is necessarily parallel to a normal line of the work piece surface.)

A vector Vc is a course correction vector. The course correction vector is parallel to a perpendicular line which runs from the position of the probe to the PCC curve. Gf, Ge, and Gc are respectively a scanning drive gain, depression direction correction gain, and course correction gain.

An exemplary PCC curve is given in FIG. 2. A PCC curve L_PCC continuous from the point P1 to the point P7 is divided into a plurality of segments at points P. (Each segment is also a PCC curve.) An end point of each segment is a starting point of the following segment (PCC curve). Here, coordinates of the starting point of the segment is expressed as $(K_{X0}, K_{Y0}, K_{Z0})$, and a length of a straight line between the starting point and end point on the PCC curve is defined as D. When so defined, coordinates $\{X(S), Y(S), Z(S)\}$ at a desired position on the PCC curve are expressed by the formulas below using coefficients expressing a cubic curve $(K_{X3}, K_{X2} \ldots K_{Z1}, K_{Z0})$.

$$X(S) = K_{X3}S^3 + K_{X2}S^2 + K_{X1}S + K_{X0}$$

$$Y(S) = K_{Y3}S^3 + K_{Y2}S^2 + K_{Y1}S + K_{Y0}$$

$$Z(S) = K_{Z3}S^3 + K_{Z2}S^2 + K_{Z1}S + K_{Z0}$$

When the work piece is formed in a simple shape such as a flat surface or a circle having a constant curvature, the path for scanning measurement can be a simple shape such as a straight line or a circle, and therefore dividing the PCC curve into many segments is not required. However, a measurement site on the work piece has a complicated shape, and to perform a highly accurate scanning measurement while accurately tracking such a measurement site, the number of segments needs to be increased by finely dividing the PCC curve into pieces. For example, to perform the scanning measurement of a contour shape of the curve shown in FIG.

3, the PCC curve needs to be divided into segments at a place where, for example, the curvature changes as exemplified in FIG. 4. In such cases, the following issue has arisen.

When the number of segments increases, parameters (coefficient of the PCC curve) included in a measurement instruction become enormous as a result. A control device (motion controller) of a shape measuring apparatus also has an upper limit on storage capacity. Therefore, even though the path for scanning measurement is continuous, a measurement command including enormous information (coefficients) can neither be received nor processed all at once. Accordingly, the measurement command has to be divided so as not to exceed the storage capacity of the control device (motion controller).

An example is considered where the storage capacity of the control device (motion controller) is capable of storing coefficient information (a measurement command) of up to eight segments. (In an actual machine, a couple of thousand (for example, 2000) segments can be stored. In this example, the number is smaller for easier understanding.) Then, the measurement command is divided as exemplified in FIG. 5. A measurement command C1 includes information for eight segments. The following measurement command C2 also includes information for eight segments.

In the present state, divided individual measurement commands are divided and processed as separate measurement commands (measurement sites) having no relation to each other. FIG. 6 shows an image where each measurement command is separated from the others. (A connection between the measurement command C1 and the measurement command C2 is eliminated).

A first measurement command is defined as "approach→scanning measurement→stop→retraction." Therefore, an operation of "stop→retraction→approach" occurs between the first measurement command and the following measurement command. FIG. 7 exemplifies a speed plan for each measurement command C. As exemplified in FIG. 7, at the end of the measurement command C1, the displacement speed of the probe is zero and the probe stops, performs retraction, and then performs the approach and moves to the measurement command C2.

Moreover it takes a lot of time until the subsequent "approach" starts after performing the "retraction." After retraction, the control device receives the subsequent measurement command, and then the speed plan is created according to the curvature of each segment. The calculation time is the waiting time. Waiting takes considerably longer when receiving and calculating a large amount of data that is close to the upper limit of the storage capacity of the control device (motion controller).

When the shape measuring apparatus completely stops in the middle of a measurement operation which should be continuous, a user may feel uneasy. In addition, in regards to data processing, the measurement path should be a continuous line, and therefore, sampling data obtained with the divided measurement commands needs to be connected in the end. However, such a connection process is complicated. In addition, when the stop process comes in between, this causes the measurement accuracy to drop, influenced by deceleration or acceleration.

SUMMARY OF THE INVENTION

The present invention provides a control method of a shape measuring apparatus which can continue measurement operations as a series of movements without stopping even when a path for scanning measurement is complicated.

The control method of the shape measuring apparatus according to the present invention includes a probe having a stylus tip at a forefront end and a displacement mechanism displacing the probe, and detects contact between the stylus tip and a surface of a work piece and measures a shape of the work piece. Based on design data of the work piece, the method finds a scanning path over which to displace the stylus tip, and displaces the stylus tip along the scanning path while controlling a deflection amount of the probe toward the work piece to remain at a standard deflection amount. During this operation, the scanning path is divided after every predetermined number of segments and a set of measurement commands $C_i$ (i is an integer from 1 to n+1) is defined for each of the predetermined number of segments; while executing the measurement command $C_i$, a speed pattern plan is created for the following measurement command $C_{i+1}$; planning is conducted at this time such that a final speed of a speed pattern plan $P_{vi}$ of the measurement command $C_i$ is the same as an initial speed of a speed pattern plan $P_{vi+1}$ of the measurement command $C_{i+1}$; and the end of the measurement command $C_i$ and the beginning of the measurement command $C_{i+1}$ are connected and the probe is displaced without stopping. The final speed of the speed pattern plan $P_{vi}$ of the measurement command $C_i$ and the initial speed of the speed pattern plan $P_{vi+1}$ of the measurement command $C_{i+1}$ are not 0 mm/sec.

In an embodiment of the present invention, preferably, the final speed of the speed pattern plan $P_{vi}$ of the measurement command $C_i$ is set at a low speed of 1 mm/sec to 5 mm/sec.

In an embodiment of the present invention, preferably, when a time required to generate the speed pattern plan corresponding to one measurement command $C_i$ is designated as a planning calculation time $T_p$, a gap time (from a current time to estimated end time of the one measurement command $C_i$) is calculated continuously while executing the measurement command $C_i$; when the gap time is longer than the planning calculation time $T_p$, a connecting speed plan is generated to keep the initial speed of the speed pattern plan $P_{vi+1}$ of the measurement command $C_{i+1}$ the same as the final speed of the speed pattern plan $P_{vi}$ of the measurement command $C_i$; and when the gap time is shorter than the planning calculation time $T_p$, an individual speed plan is created to keep the initial speed of the speed pattern plan $P_{vi+1}$ of the measurement command $C_{i+1}$ at zero.

In an embodiment of the present invention, preferably, the number of segments included in a measurement command $C_n$ and the number of segments included in a measurement command $C_{n+1}$ are averaged.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
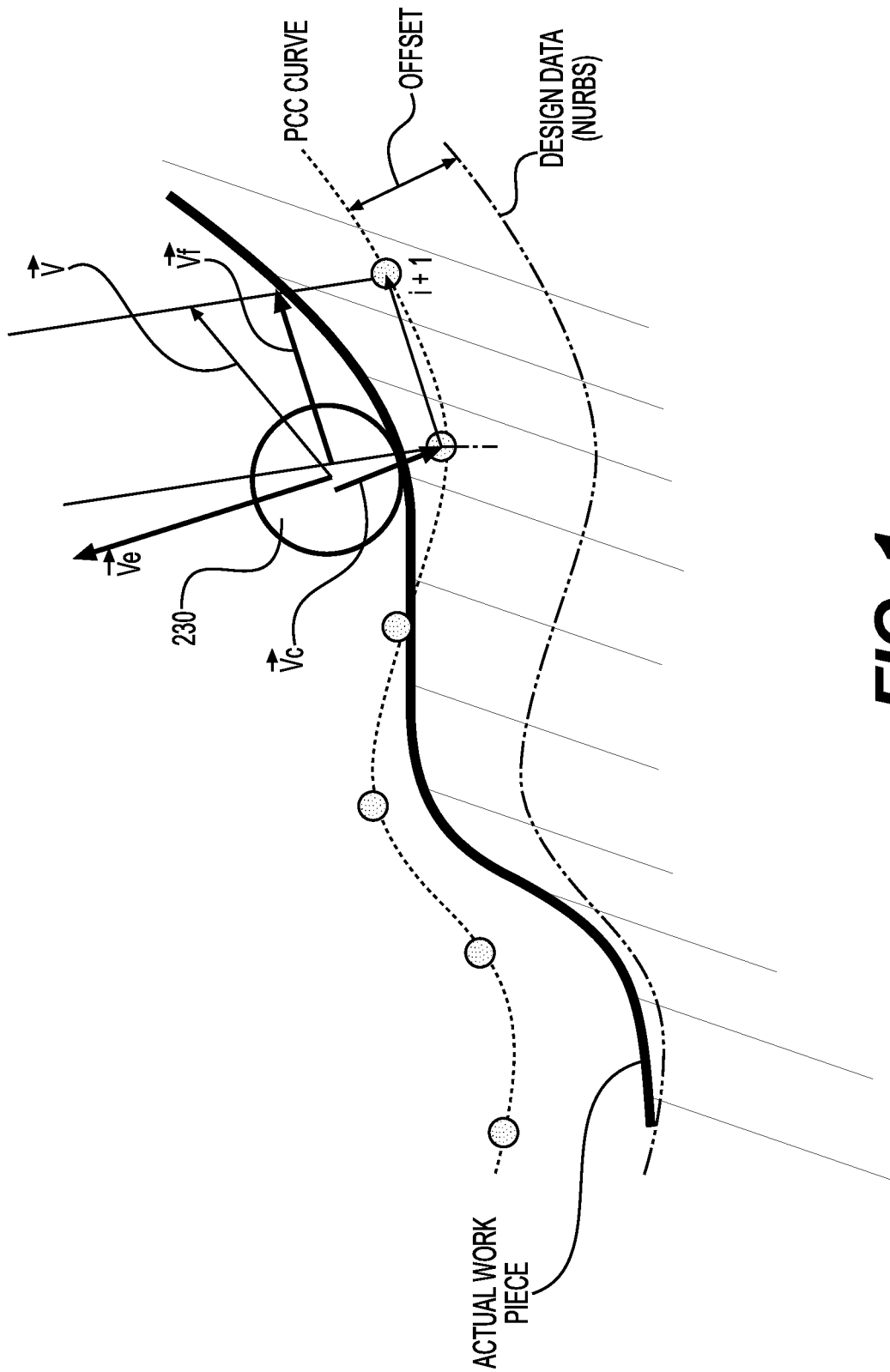
FIG. 1 schematically illustrates a relationship between design data (contour point data), a PCC curve, and a composite vector V.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of an embodiment of the present invention is given with reference to the drawings and to the reference numerals assigned to each component in the drawings.

First Embodiment

Figure 8:
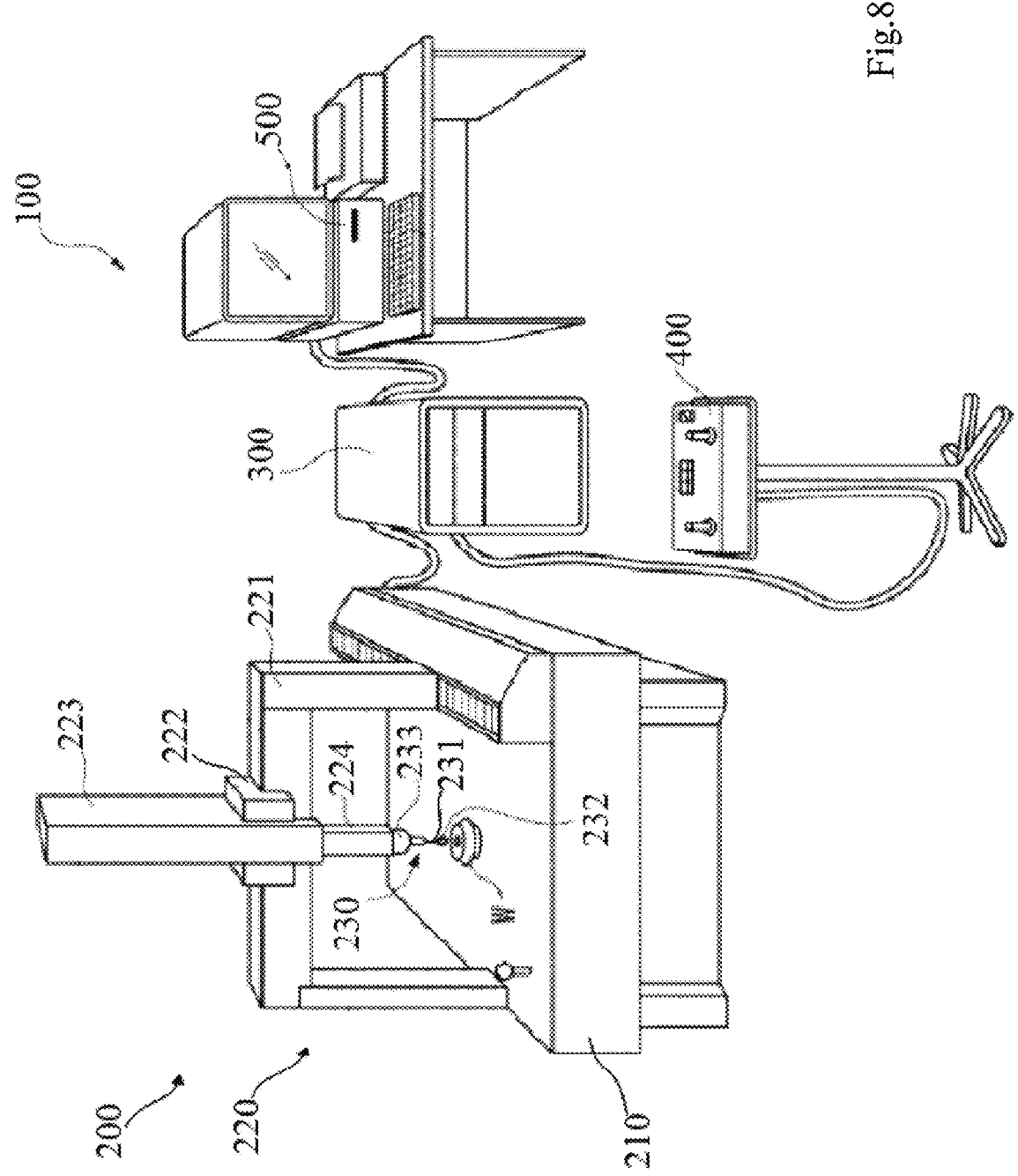
FIG. 8 illustrates an overall configuration of a shape measurement system.

FIG. 8 illustrates an overall configuration of a shape measurement system 100. The shape measurement system 100 includes a coordinate measuring machine 200, a motion controller 300 controlling activation of the coordinate measuring machine 200, and a host computer 500 controlling the motion controller 300 and executing necessary data processing.

The coordinate measuring machine 200 includes a stage 210, a displacement mechanism 220, and a probe 230.

The displacement mechanism 220 includes a gate-shaped Y slider 221 provided so as to be capable of sliding above the stage 210 in a Y direction, an X slider 222 sliding along a beam of the Y slider 221 that lies in an X direction, a Z axis column 223 fixated to the X slider 222, and a Z spindle 224 rising and lowering inside the Z axis column 223 in a Z direction.

A drive motor (not shown in the drawings) and an encoder (not shown in the drawings) are attached to each of the Y slider 221, X slider 222, and Z spindle 224. Each drive motor is drive controlled by a drive control signal from the motion controller 300. The encoders detect a displacement amount of the Y slider 221, X slider 222, and Z spindle 224 respectively and output detection values to the motion controller 300. The probe 230 is attached to a bottom end of the Z spindle 224.

The probe 230 includes a stylus 231 having a stylus tip 232 on a forefront end (−Z axis direction side) and a supporter 233 supporting a base end (+Z axis direction side) of the stylus 231. The stylus tip 232 is spherical and comes in contact with a measured object W.

When an outside force is applied to the stylus 231 (in other words, when the stylus tip 232 is in direct contact with the measured object), the supporter 233 supports the stylus 231 so as to enable displacement of the stylus 231 within a fixed range in each of the X, Y, and Z axis directions. Further, the supporter 233 includes a probe sensor (not shown in the drawings) detecting a position of the stylus 231 in each axis direction. The probe sensor outputs the detection value to the motion controller 300.

Configuration of Motion Controller 300

Figure 9:
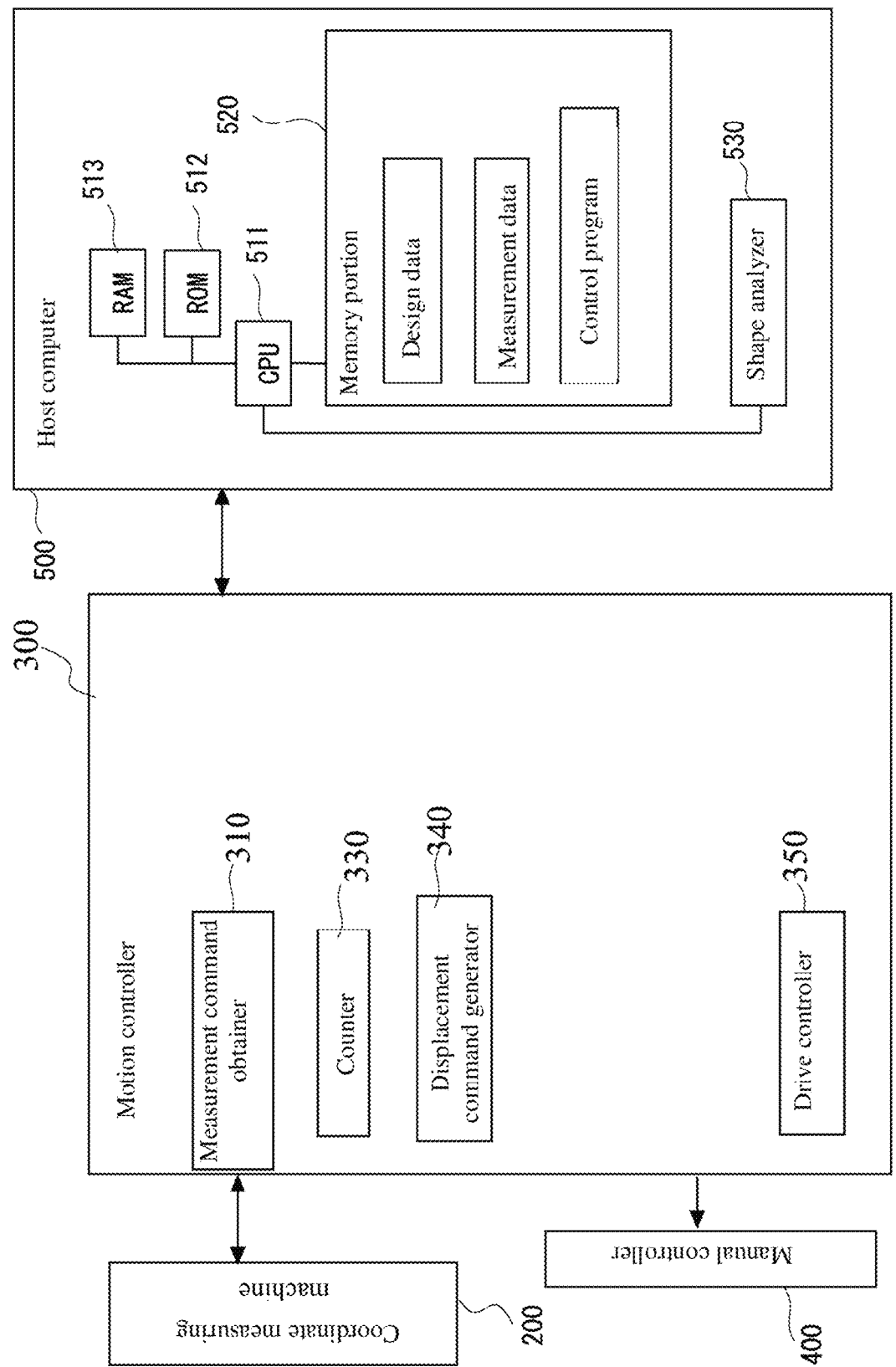
FIG. 9 is a functional block diagram illustrating a motion controller and a host computer.

FIG. 9 is a functional block diagram of the motion controller 300 and the host computer 500. The motion controller 300 includes a measurement command obtainer 310, a counter 330, a displacement command generator 340, and a drive controller 350.

Figure 10:
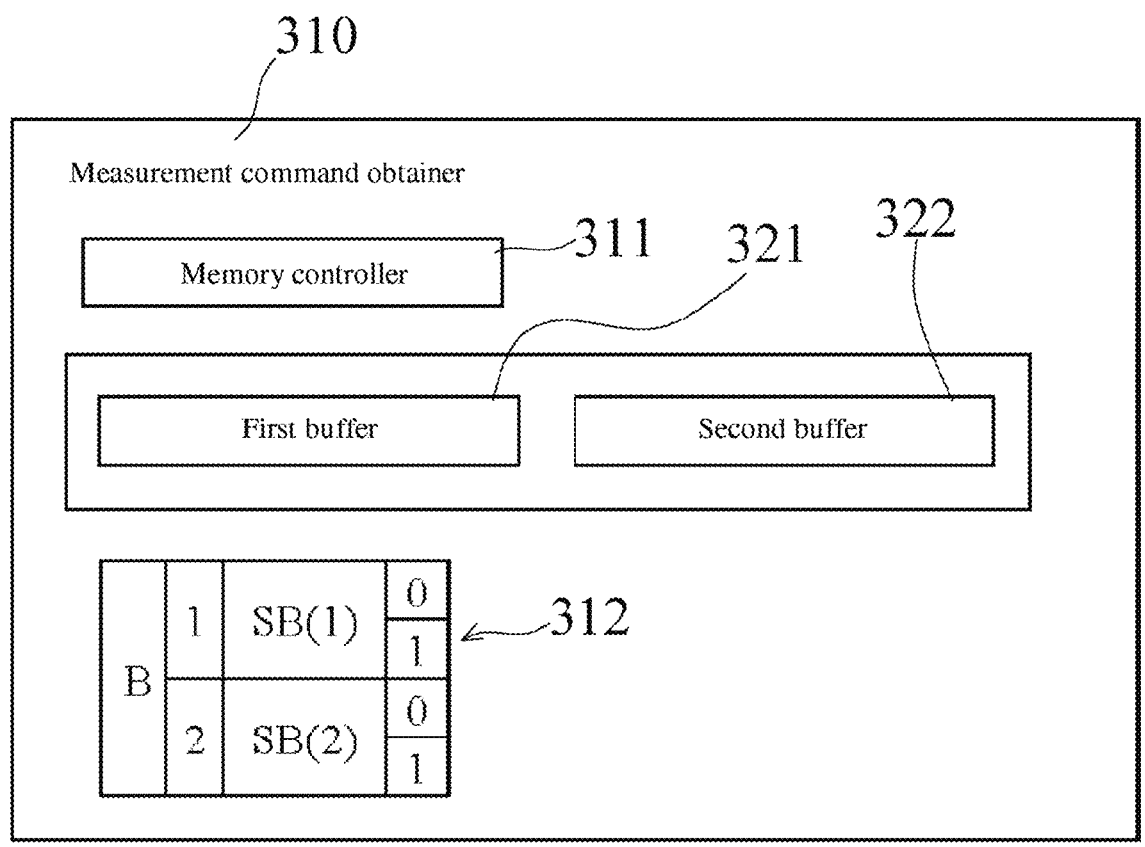
FIG. 10 illustrates a configuration of a measurement command obtainer.
Figure 12:
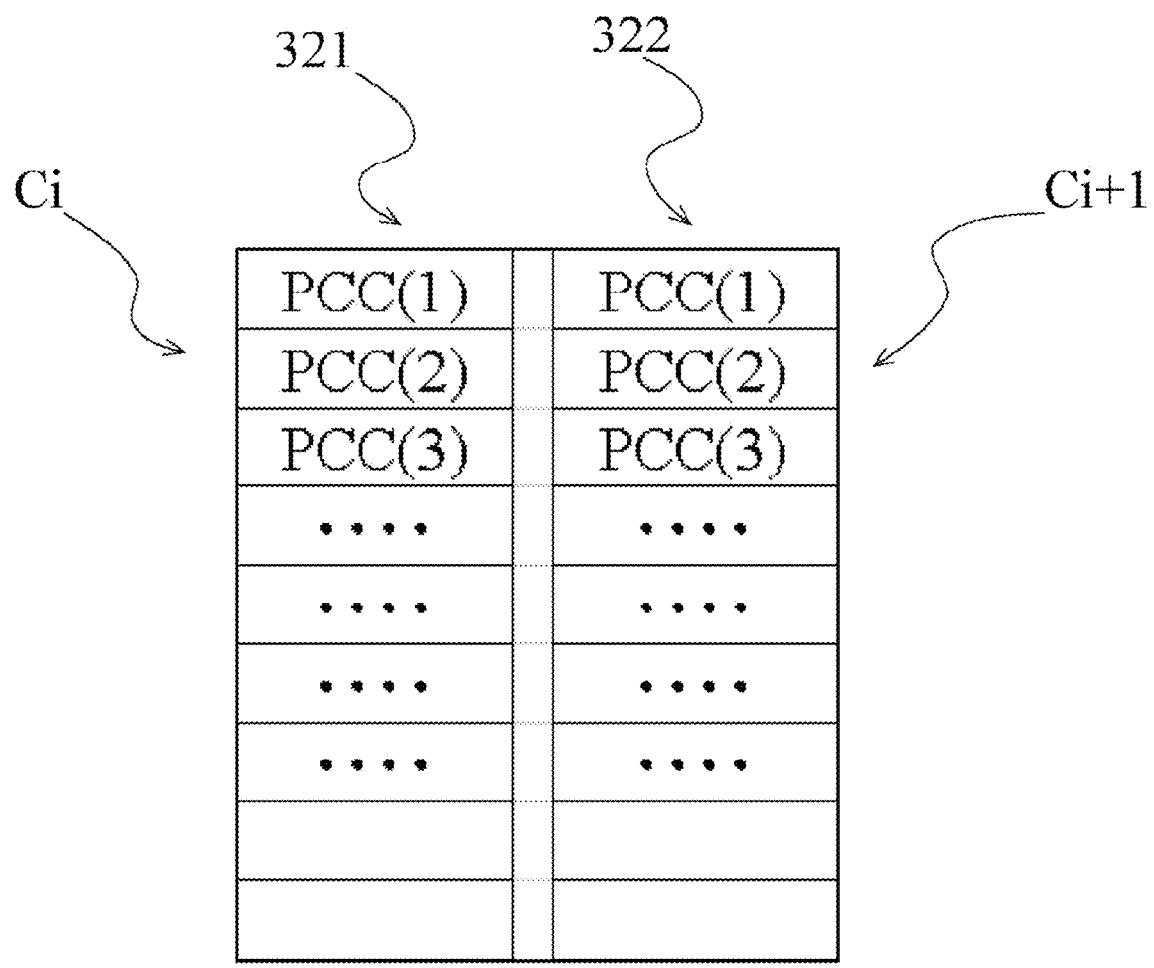
FIG. 12 schematically illustrates a state where measurement commands Ci and Ci+1 are stored in a first buffer and a second buffer, respectively.

The measurement command obtainer 310 obtains PCC curve data from the host computer 500. FIG. 10 shows a configuration of the measurement command obtainer 310. The measurement command obtainer 310 includes a memory controller 311, a first buffer 321, a second buffer 322, and a memory flag information storage portion 312. The measurement command obtainer 310 is a memory device, however, the memory is separated into several pieces (two in this example). For example, when the measurement command obtainer 310 has a total capacity capable of storing 2000 segments' worth of measurement commands, the first buffer 321 and the second buffer 322 can each store 1000 segments' worth of measurement commands. FIG. 12 schematically illustrates a state where measurement commands Ci and Ci+1 are stored in the first buffer 321 and the second buffer 322, respectively.

A small number is used merely to facilitate understanding of the present embodiment. For example, when the total capacity of the measurement command obtainer 310 can store eight segments' worth of measurement commands, the first buffer and the second buffer can each store four segments' worth of measurement commands by distributing the measurement commands between the first buffer and the second buffer. For ease of the description that follows, the maximum value for the number of segments which can be stored in one buffer is defined as P.

The memory flag information storage portion 312 is attached to the measurement command obtainer 310. A buffer identification flag B and buffer status flags SB(1) and SB(2) are stored in the memory flag information storage portion 312. The buffer identification flag B uses the first buffer 321 and the second buffer 322 alternately and indicates the next buffer to be used, and therefore, the value alternately switches between 1 and 2.

A first status flag SB(1) which is a status flag for the first buffer 321 and a second status flag SB(2) which is a status flag for the second buffer 322 are provided as the buffer status flags SB(1) and SB(2). The value of both the first status flag SB(1) and the second status flag SB(2) alternately switches between 0 and 1. In the present embodiment, "0" indicates a writable state and "1" indicates a non-writable state.

The counter 330 counts detection signals output from the encoders and measures an amount of displacement for each slider. In addition, the counter 330 counts the detection signals output from the probe sensor and measures an amount of displacement of the probe 230 (stylus 231). From the measured displacement of the sliders and the probe 230, a coordinate position PP of the stylus tip 232 (hereafter, probe position PP) is obtained. In addition, from the displacement of the stylus 231 measured by the counter 330 (detection values (Px, Py, and Pz) of the probe sensor), an amount of depression (absolute value of a vector Ep) of the stylus tip 232 is obtained.

Figure 11:
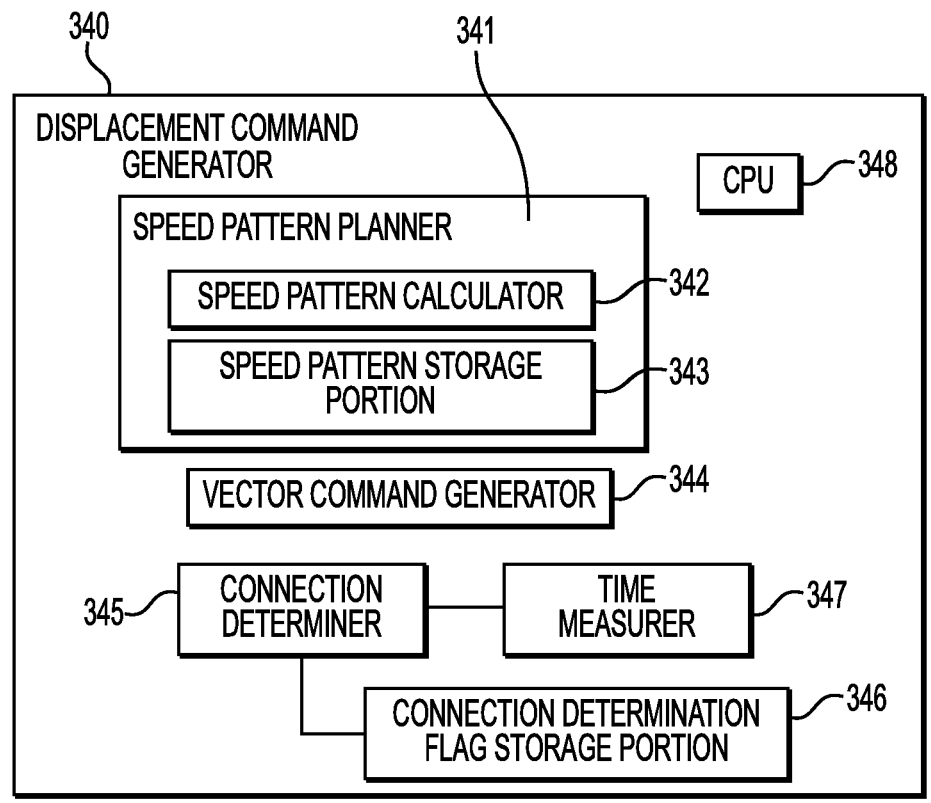
FIG. 11 illustrates a configuration of a displacement command generator.

The displacement command generator 340 calculates a displacement path of the probe 230 (stylus tip 232) for measuring the surface of the measured object with the probe 230 (stylus tip 232) and calculates a speed vector along the displacement path. FIG. 11 shows a configuration of the displacement command generator 340. The displacement command generator 340 includes a speed pattern planner 341, a vector command generator 344, a connection determiner 345, and a central processing unit (CPU) 348. In addition, a connection determination flag storage portion 346 and a time measurer 347 are attached to the connection determiner 345. The operations of each component are described below with reference to flow charts.

The drive controller 350 controls activation of each slider based on the displacement vector calculated by the displacement command generator 340.

Further, a manual controller 400 is connected to the motion controller 300.

The manual controller 400 includes a joystick and a variety of buttons, receives a manual input operation from a user, and sends an operation instruction from the user to the motion controller 300. In this case, the motion controller 300 (drive controller 350) controls activation of each slider based on the operation instruction from the user.

Configuration of Host Computer 500

The host computer 500 is configured to include a CPU (central processing unit) 511, a memory, and the like, and controls the coordinate measurement machine 200 via the motion controller 300. The host computer 500 further includes a memory portion 520 and a shape analyzer 530. The memory portion 520 stores design data (such as CAD data and NURBS data) related to a shape of the measured object (work piece) W, measurement data obtained from the measurements, and a measurement control program controlling overall measurement operations.

The shape analyzer 530 calculates surface shape data of the measured object based on measurement data output from the motion controller 300 and performs shape analysis to find errors, distortions, and the like in the calculated surface shape data of the measured object. In addition, the shape analyzer 530 also performs a computation such as conversion from the design data (CAD data, NURBS data, and the like) to a PCC curve.

The measurement operations of the present embodiment are realized by running the measurement control program using the CPU (central processing unit) 511.

An output device (a display or a printer) and an input device (a keyboard or a mouse) are connected to the host computer 500 as required.

The control method for the shape measuring apparatus according to the present embodiment is described with reference to the flow charts. The operations of the host computer 500 are described with reference to FIGS. 13 and 14. The operations in FIGS. 13 and 14 are realized by the control program stored in the memory portion 520 and by the shape analyzer 530.

Figure 2:
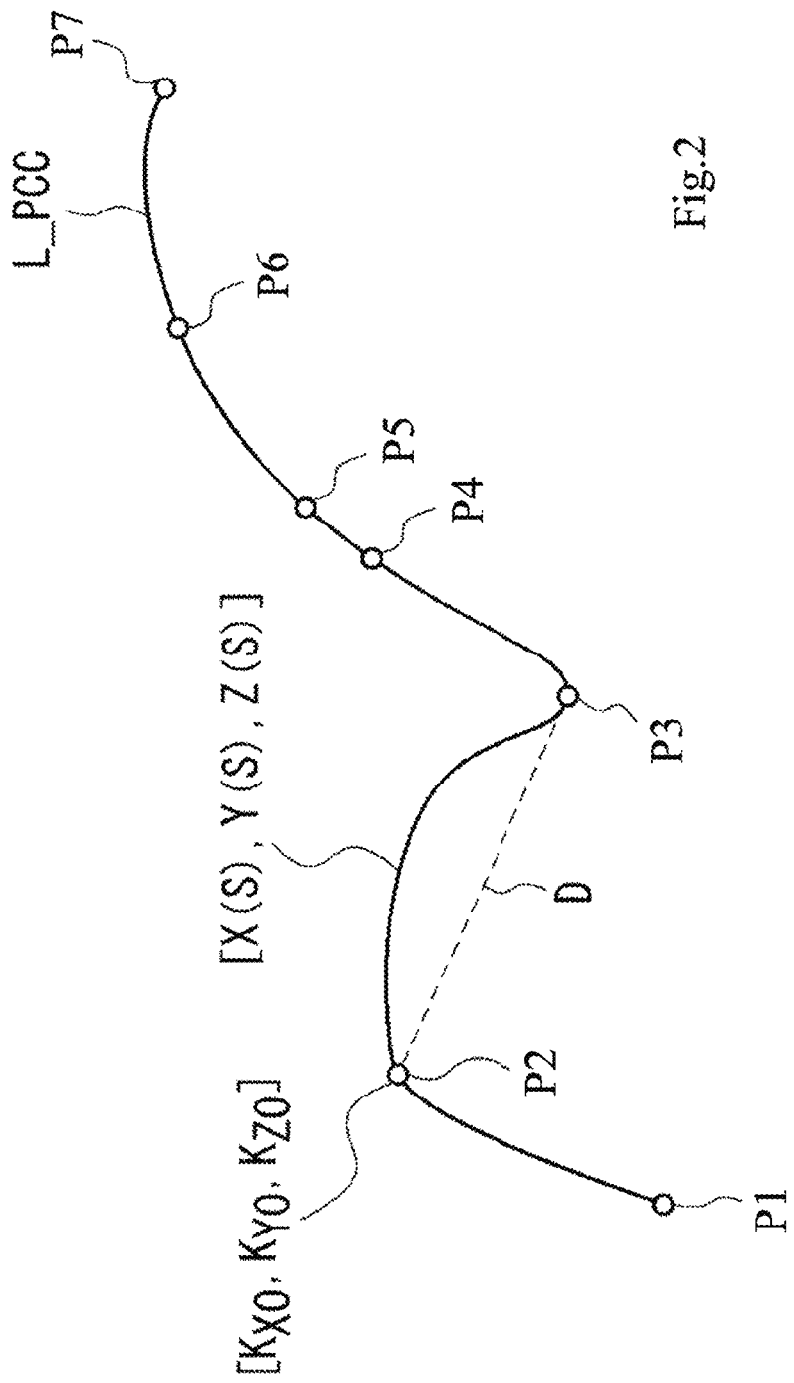
FIG. 2 illustrates an exemplary PCC curve.
Figure 3:
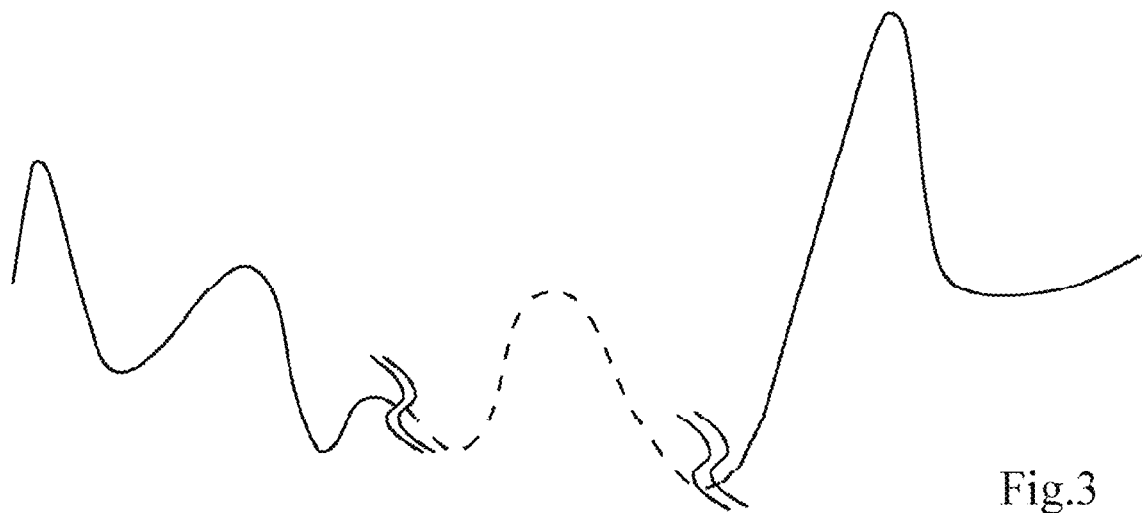
FIG. 3 illustrates an exemplary complicated path for scanning measurement (PCC curve)
Figure 4:
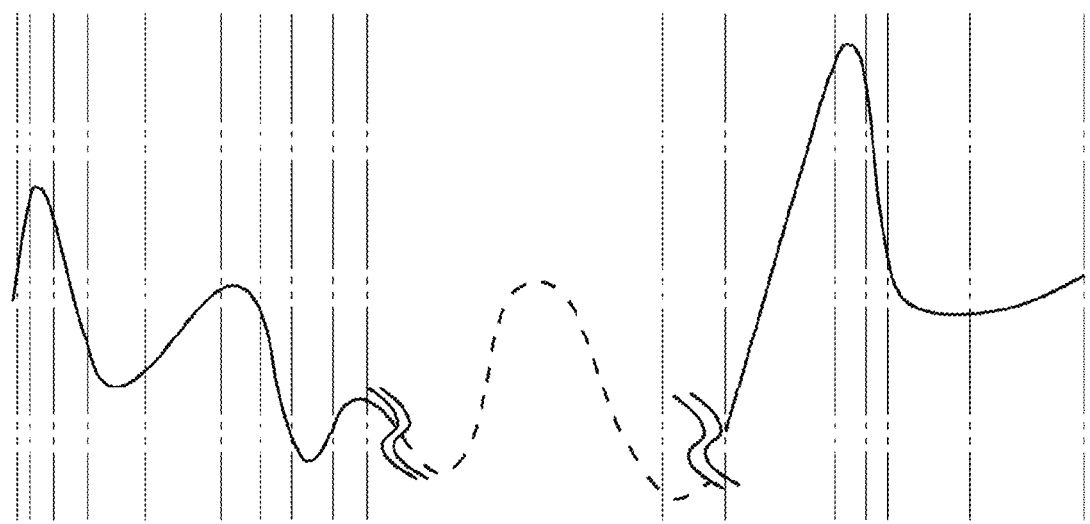
FIG. 4 illustrates an example where the PCC curve is divided into segments.
Figure 5:
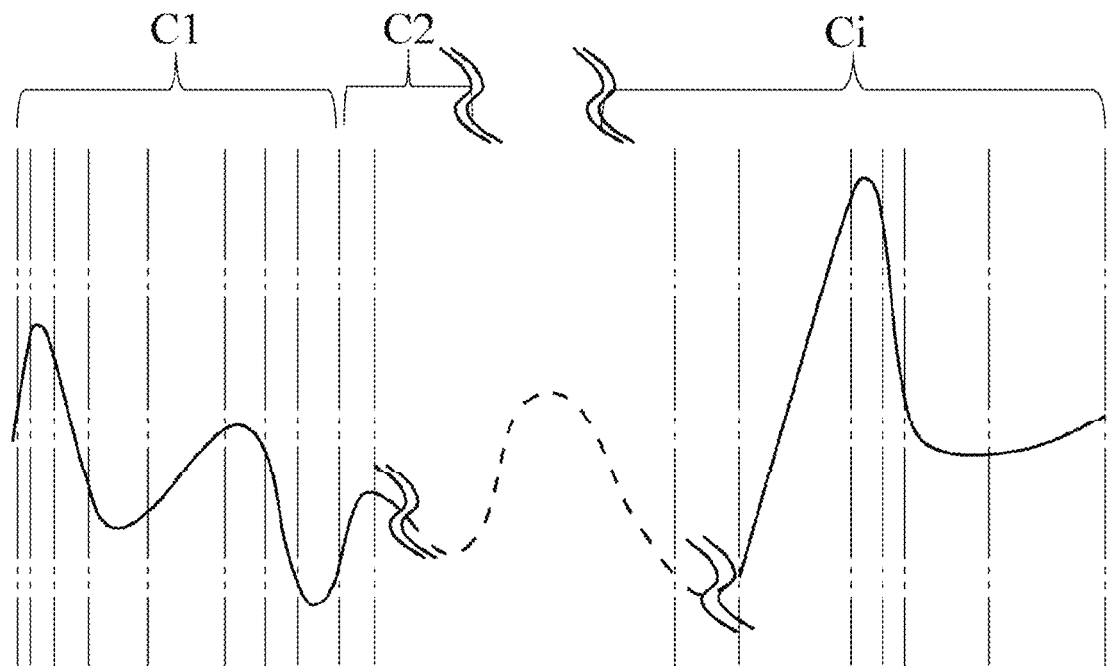
FIG. 5 illustrates an exemplary divided measurement command.
Figure 6:
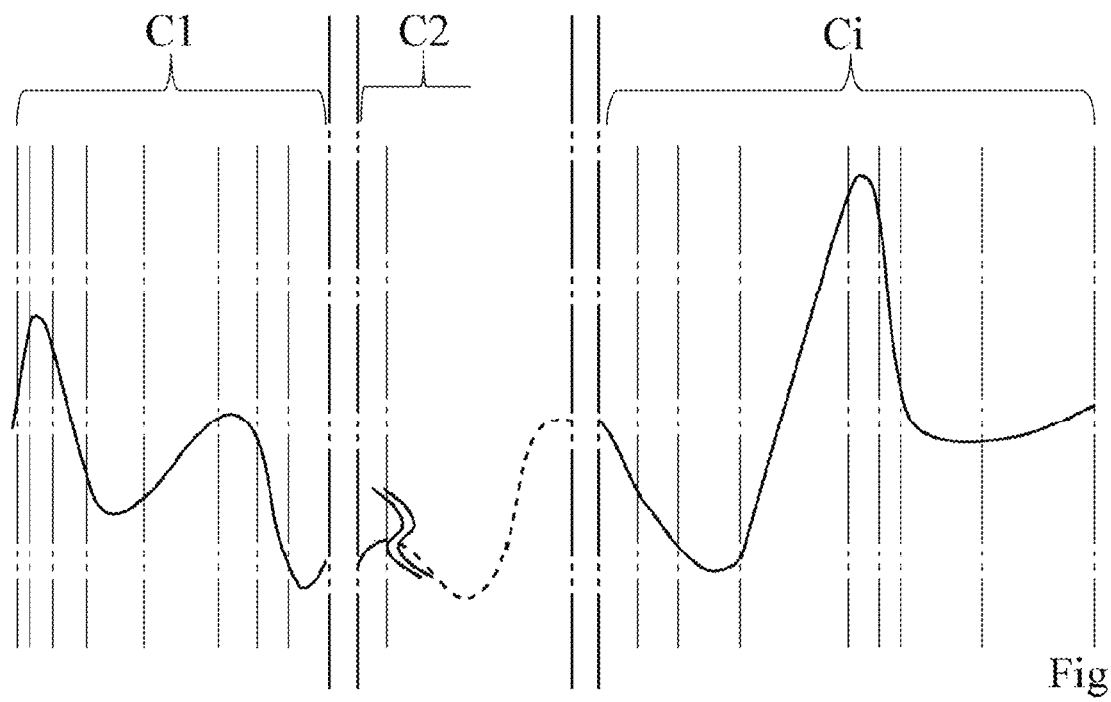
FIG. 6 illustrates an exemplary divided measurement command.
Figure 13:
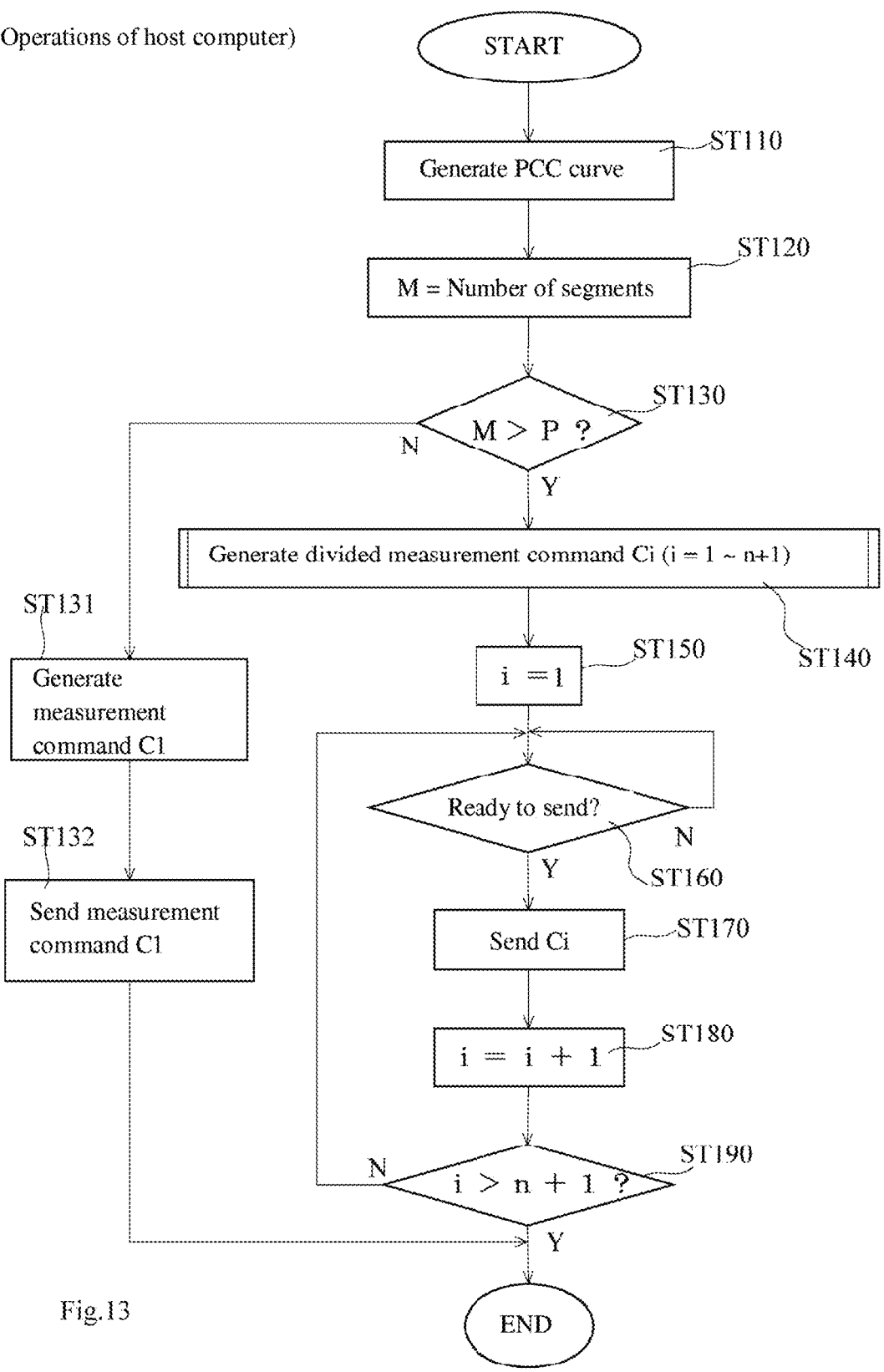
FIG. 13 is a flow chart describing operations when a host computer 500 provides a measurement command to the motion controller.
Figure 14:
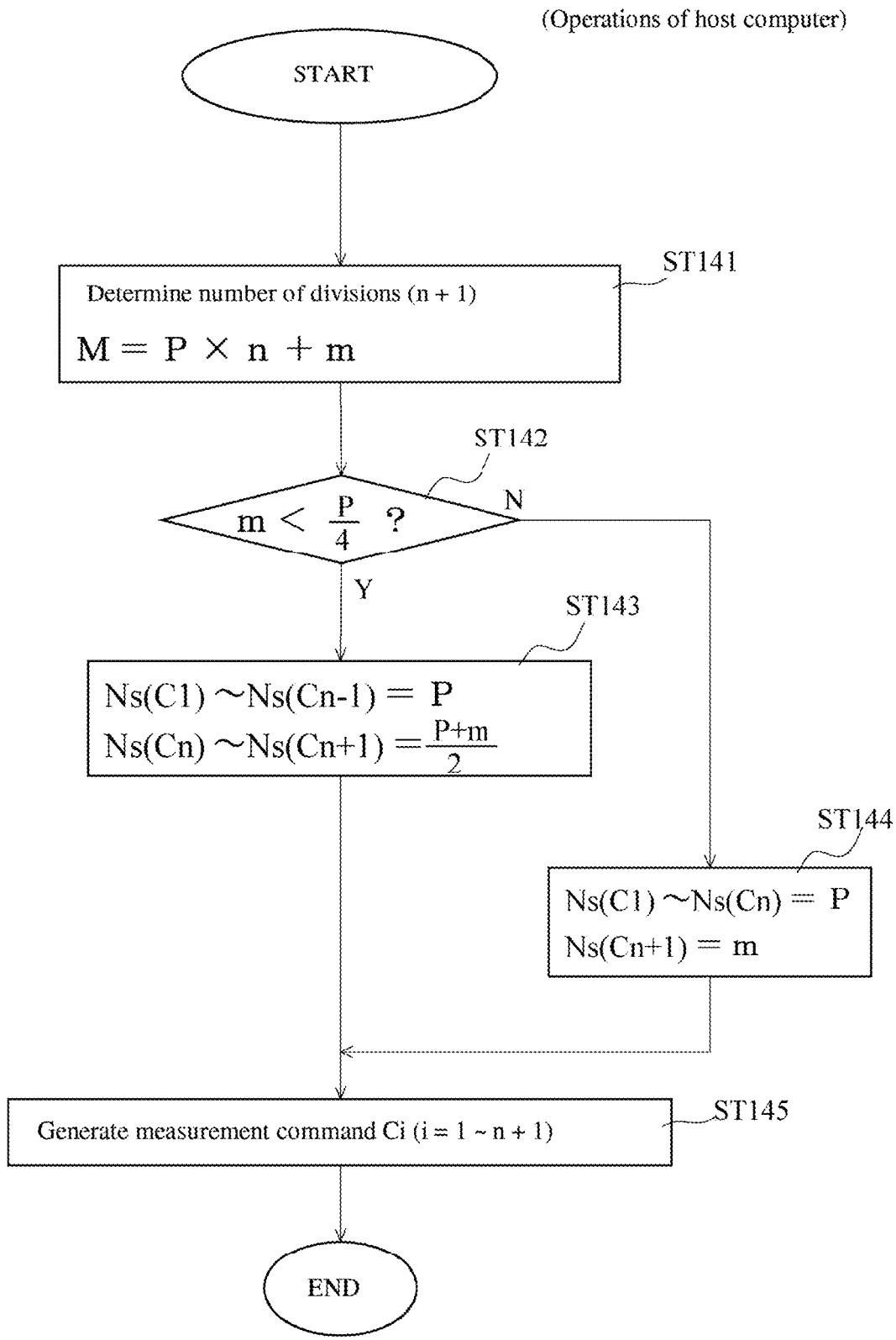
FIG. 14 is a flow chart illustrating a procedure of generating divided measurement commands Ci.

FIG. 13 is a flow chart describing operations when the host computer 500 provides a measurement command to the motion controller 300. First, the shape analyzer 530 generates a PCC curve which is a path for scanning measurement using the CAD data or the like provided from an external source (ST110). This operation is already described in the prior art. (For example, see FIGS. 1 to 3.) Further, the total number of segments of the PCC curve is designated as M (ST120).

The measurement command obtainer 310 of the motion controller 300 includes the first buffer 321 and the second buffer 322 and the maximum value for the number of segments each buffer can receive is designated as P. Accordingly, if the total number of segments M of the PCC curve is equal to or less than P (ST130: NO), coefficient information of all segments included in the continuous PCC curve can be received, as one measurement command, by the measurement command obtainer 310. In this case, the shape analyzer 530 generates the coefficient information of all segments as one measurement command C1 (ST131), and sends the measurement command C1 to the measurement command obtainer 310 of the motion controller 300 (ST132). The operation itself is the same as that in the prior art.

However, when the total number of segments M of the PCC curve exceeds P (ST130: YES), coefficient information of all segments cannot be received by the measurement command obtainer 310 as one measurement command. In the present embodiment, the measurement command obtainer 310 is divided into two buffers intentionally so that the number of segments (P) that can be received at once is small, and therefore, the total number of segments M is likely to exceed P.

In this case, the shape analyzer 530 generates divided measurement commands Ci (ST140). Basically, as in the conventional case, the number of segments included in one measurement command is set to be equal to or less than the capacity of the buffer. Additionally, in the present embodiment, the number of segments included in each measurement command is averaged, and therefore, this procedure is described in sequence using FIG. 14.

FIG. 14 is a flow chart illustrating a procedure of generating the divided measurement command (partitioned measurement command) Ci. First, the number of divisions (n+1) is determined based on the relationship between the total number of segments M and the buffer capacity P (ST141). In other words, the greatest quotient n which satisfies $M = P \times n + m$ is determined and the remainder is designated as m.

It is possible to generate (n+1) measurement commands by simply dividing the PCC curve every P segments. However, the number of segments included in each measurement command Ci is averaged, with a little consideration paid to the final remainder m. In other words, when the remainder m is less than (P/4) (ST142: YES), only the last measurement command Cn+1 has extremely low information. For the measurement commands C1 to Cn−1, the number of segments is set, as conventionally, to P in accordance with the maximum value of the buffer capacity. However, the last measurement commands Cn and Cn+1 are averaged using {(P+m)/2} (ST143).

Figure 15:
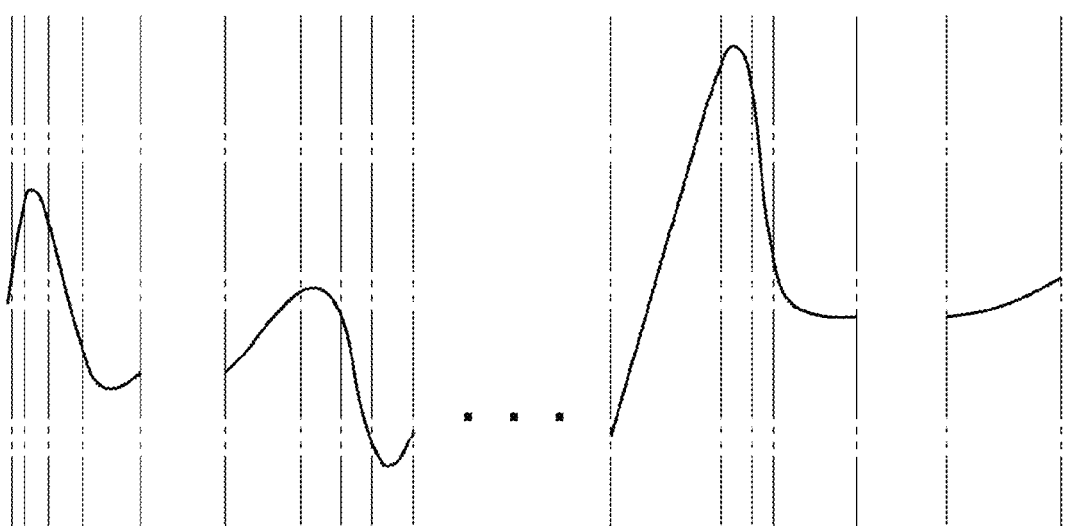
FIG. 15 illustrates an example where the PCC curve is divided at every fourth segment.

FIG. 15 illustrates an example where the PCC curve is divided at every fourth segment. In this example, the final remainder m is "1," or P/4=1 (ST142: NO). Therefore, the averaging process (ST143) is not performed (ST144), and the PCC curve is divided every P (=4) and the number of segments in the last measurement command Cn+1 is 1. Moreover, in FIG. 14, Ns (Ci) should be interpreted as expressing the number of segments Ns included in the measurement command Ci.

The measurement command Ci (i=1 n+1) is generated in this way.

Returning to FIG. 13, going forward, when one of the buffers 321 and 322 of the measurement command obtainer 310 is ready to receive (ST160: YES), the host computer 500 sends one measurement command Ci to the measurement command obtainer 310 of the motion controller 300, in order beginning with the measurement command C1 (ST170). The value ("0" or "1") of the buffer status flags SB(1) and SB(2) expresses whether the buffers 321 and 322 of the measurement command obtainer 310 are ready to receive, and the host computer 500 constantly monitors the buffer status flags SB(1) and SB(2). The timing at which the values of the buffer status flags SB(1) and SB(2) are updated is described later (ST214 and ST224 in FIG. 16 and ST441 in FIG. 20).

Figure 16:
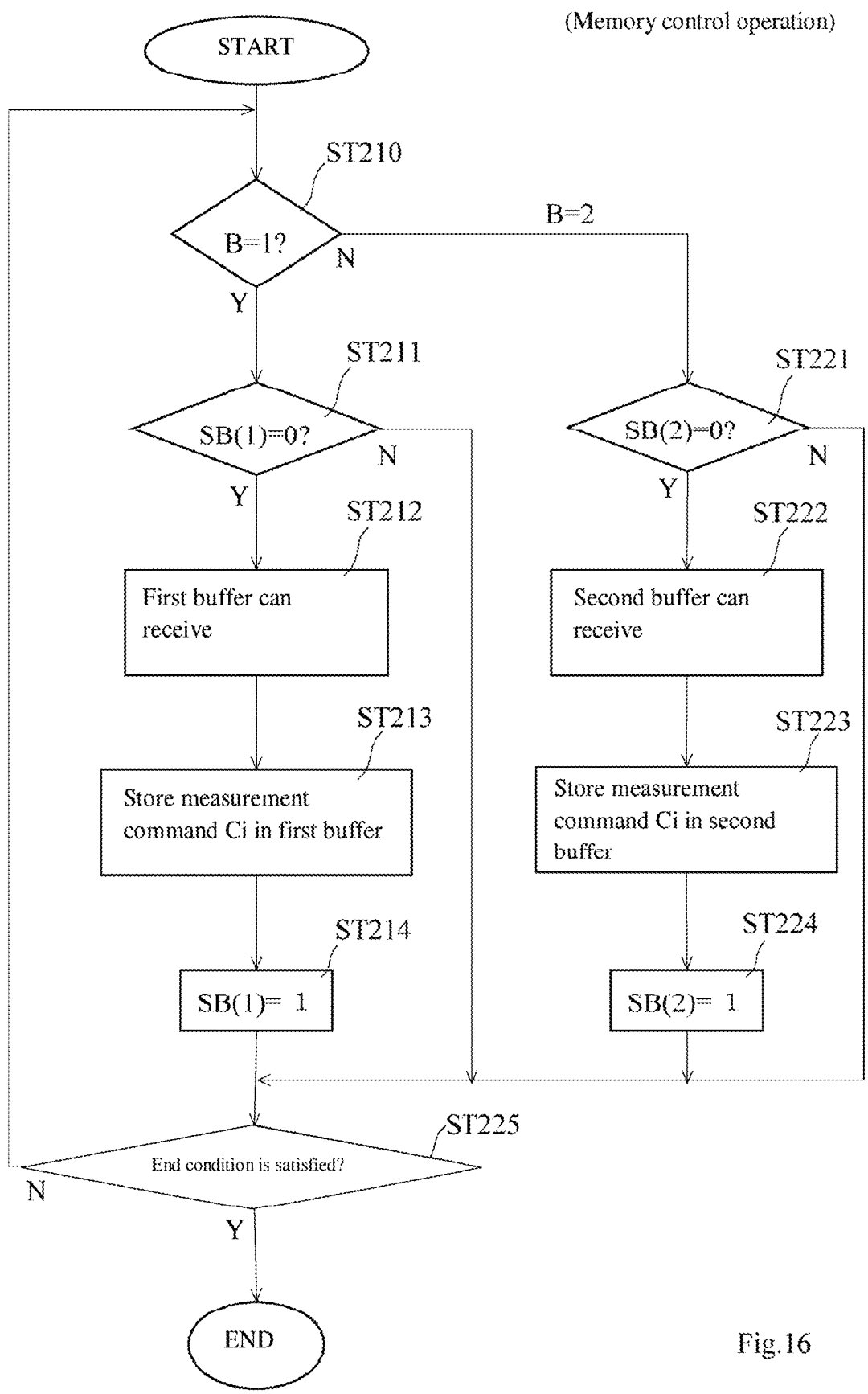
FIG. 16 is a flow chart describing operations when the measurement commands are alternately stored in the first buffer and the second buffer.

Next, the operations of the motion controller 300 are described. FIG. 16 is a flow chart describing operations when the measurement commands are alternately stored in the first buffer 321 and the second buffer 322 of the measurement command obtainer 310. The control operations in FIG. 16 are executed by the memory controller 311. The memory controller 311 determines when and to which buffer to store the data by referring to the status of the buffer identification flag B, and buffer status flags SB(1) and SB(2) stored in the memory flag information storage portion 312.

First, the memory controller 311 checks the status of the buffer identification flag B (ST210). The value of the buffer identification flag B switches alternately between "1" and "2." The timing at which the value switches is described later (ST402 in FIG. 20).

When the value of the buffer identification flag B is "1" (ST210: YES), this indicates it is time to use the first buffer 321, and the first status flag SB(1) indicating the status of the first buffer 321 is checked (ST211). The status flags SB(1) and SB(2) show "0" to indicate a status where the buffer is writable and show "1" to indicate a status where the buffer is not writable. (The timing at which the status flags SB(1) and SB(2) are updated to "0" is described later (ST214 and ST224 in FIG. 16 and ST441 in FIG. 20)).

When the status flag SB(1) of the first buffer 321 is "0" (=writable state) (ST211: YES), the first buffer 321 is writable (ST212).

When the first buffer 321 is writable (ST212), the measurement command Ci can be transmitted from the host computer 500 to the measurement command obtainer 310 (ST160 in FIG. 13: YES). Therefore, the measurement command Ci is transmitted from the host computer 500 to the measurement command obtainer 310. The measurement command Ci transmitted in this way is stored in the first buffer 321 by the memory controller 311 (ST213). When the measurement command Ci is newly stored in the first buffer 321, the memory controller 311 updates the status flag SB(1) of the first buffer 321 to "1" (=non-writable).

However, in ST210, when the buffer identification flag B is "2," this indicates it is time to use the second buffer 322, and therefore, the memory controller 311 proceeds to check the second status flag SB(2) indicating the status of the second buffer 322 (ST221). The operations thereafter correspond to the operation of writing data to the first buffer 321, so a lengthy description thereof is omitted.

In this way, the measurement commands are stored in order, alternating between the first buffer 321 and the second buffer 322 (see FIG. 12 for example).

Figure 7:
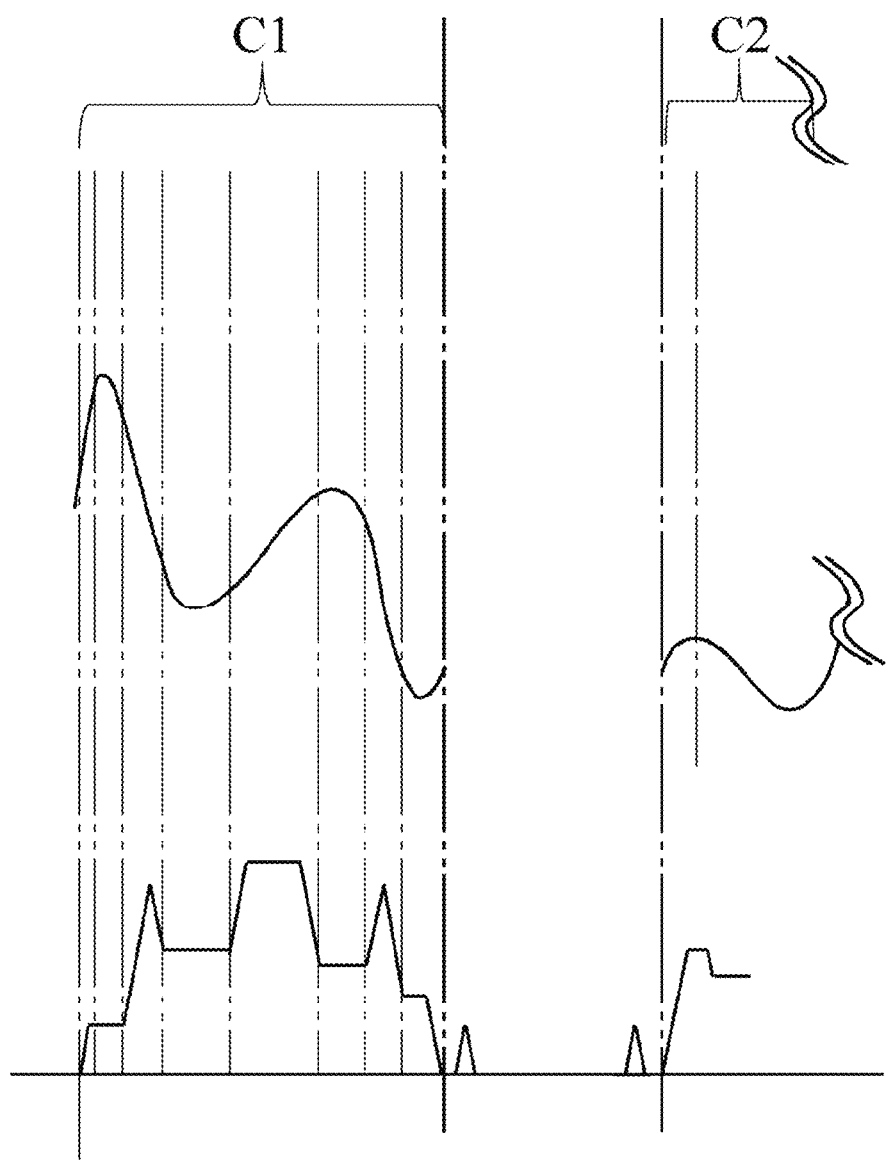
FIG. 7 illustrates a speed plan for each measurement command C.
Figure 17:
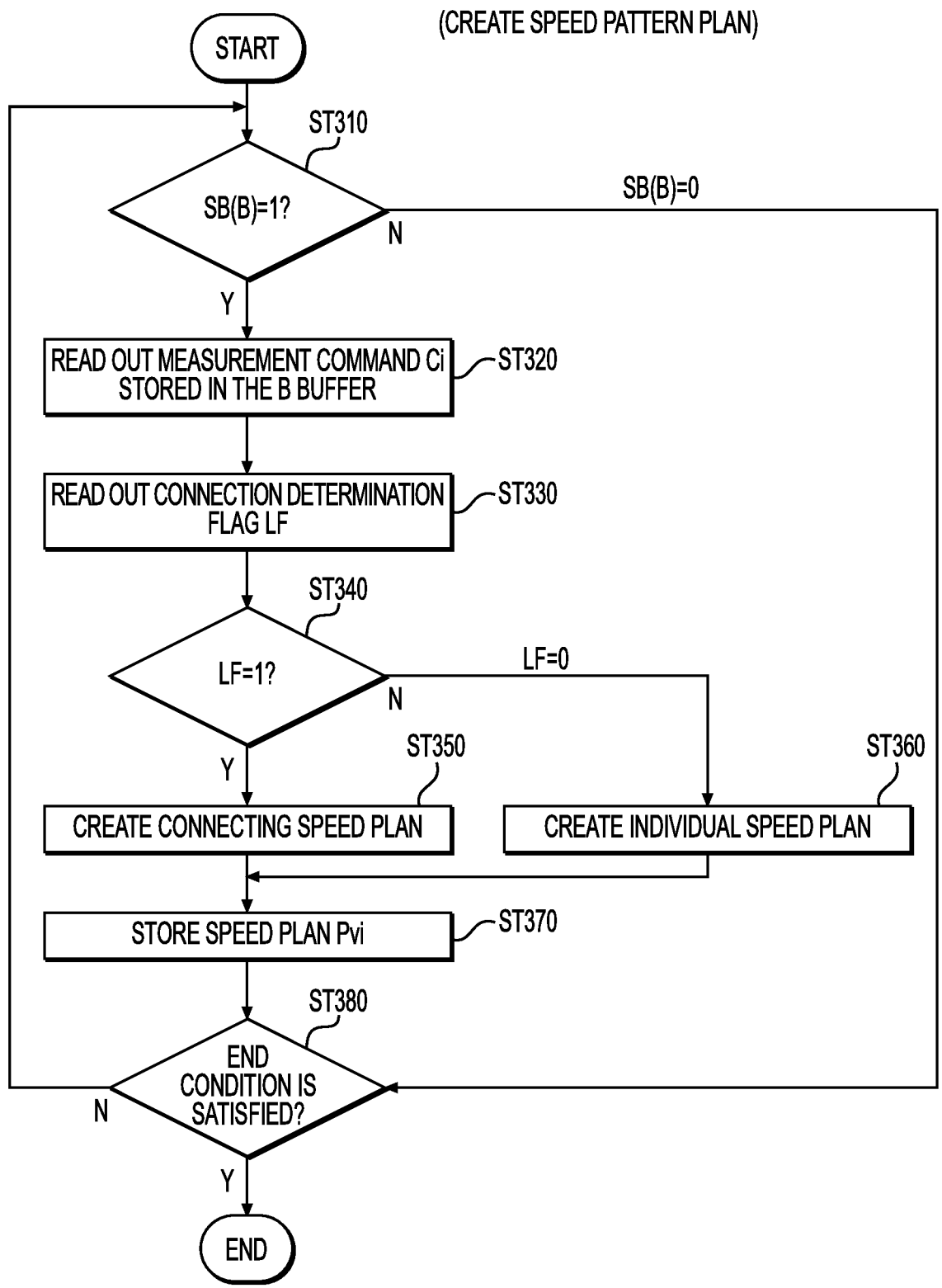
FIG. 17 is a flow chart illustrating a procedure when a speed pattern is created based on the measurement command Ci stored in a buffer 321 or 322.

FIG. 17 is a flow chart illustrating a procedure when a speed pattern is created based on the respective measurement command Ci stored in each of the buffers 321 and 322 of the measurement command obtainer 310. The speed pattern planner 341 reads out sequentially the measurement commands Ci stored in the buffers 321 and 322 of the measurement command obtainer 310 and generates a speed pattern matching the respective measurement command Ci. For example, refer to FIG. 7 (Prior Art) for an exemplary speed pattern. The speed pattern is generated appropriately by considering, for example, the curvature at each point on the PCC curve (segment), required measurement accuracy, allowable measurement time, and the like. The art of creating an individual speed pattern matching the respective PCC curve (segment) provided is already known.

The speed pattern planner 341 constantly monitors the buffer status flags SB(1) and SB(2) (ST310). "B" in SB(B) means the value of the buffer identification flag B (1 or 2) at that point in time. Accordingly, specifically, the speed pattern planner 341 first checks the value of the buffer identification flag B (1 or 2) and then checks the status (SB(B)) of the buffer 321 or 322 indicated by the buffer identification flag B.

The speed pattern planner 341 waits until the buffer status flag SB(B) turns to "1" (ST310: NO). When the buffer status flag SB(B) turns to "1" (ST310: YES), the speed pattern planner 341 reads out the measurement command Ci stored in the B buffer (321 or 322) (ST320). The timing at which the buffer status flag SB(B) turns to "1" is as described in FIG. 16: when a measurement command Ci is newly stored in the B buffer 321 or 322, the buffer status flag SB(B) turns to "1" (ST214 and ST224).

When the speed pattern planner 341 newly reads out the measurement command Ci (ST320), the speed pattern planner 341 proceeds to check a connection determination flag LF (ST330). The connection determination flag LF is a flag LF stored in the connection determination flag storage portion 346 and indicates whether the in-progress the measurement command Ci−1 and the following measurement command Ci can be performed continuously. The connection determination flag LF is regularly updated based on the determination made by the connection determiner 345. How the connection determiner 345 determines the value of the connection determination flag LF (1 or 0) is described later in detail with reference to the flow chart in FIG. 22. In this example, when the value of the connection determination flag LF is "1," it is determined that "the in-progress measurement command Ci−1 and the following measurement command Ci can be connected," whereas when the value of the connection determination flag LF is "0," it is determined that "the in-progress measurement command Ci−1 and the following measurement command Ci cannot be connected." The below description follows on the above-noted determination.

When the speed pattern planner 341 checks the connection determination flag LF (ST330), the value of the connection determination flag LF is "0" (ST340: NO). In other words, it is determined that "the in-progress measurement command Ci−1 and the following measurement command Ci cannot be connected." In this case, the speed pattern planner 341 creates "an individual speed plan" based on the measurement command Ci. The individual speed plan is the same as the conventional speed plan except in one aspect.

Figure 18:
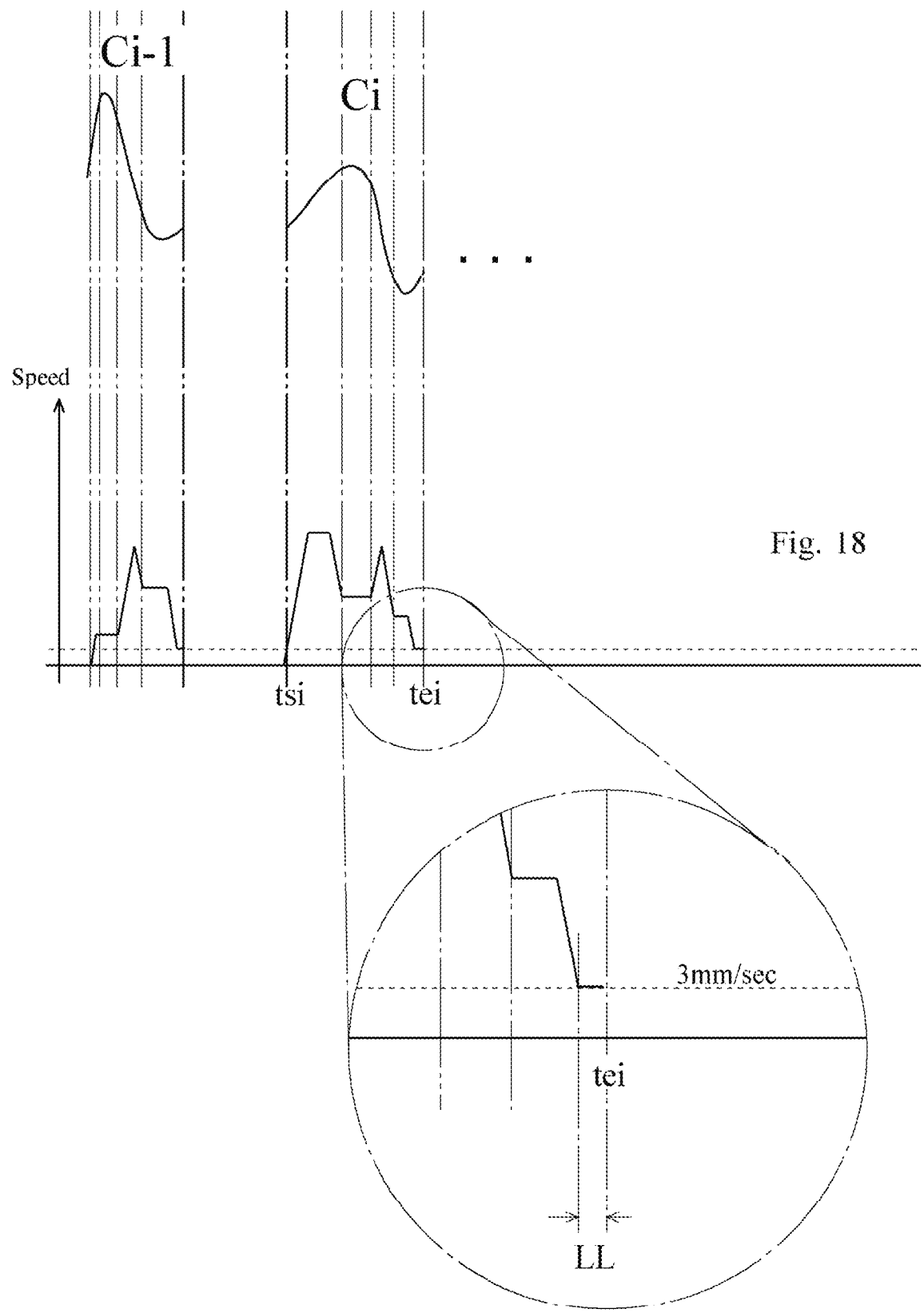
FIG. 18 illustrates an exemplary individual speed plan.

As exemplified in FIG. 15, the measurement command Ci is divided at every fourth segment. Then, for example, the individual speed plan (see FIG. 18 for example) for the respective measurement command Ci is generated. Each measurement command Ci is processed individually without connecting to the previous measurement command Ci−1. In this case, the speed pattern of performing the measurement command Ci approaches a measurement starting point and starts from speed zero at the measurement starting point. Then, in accordance with the curvature and the like of each segment, the displacement speed at which each segment (PCC curve) undergoes scanning displacement is determined, starting from the first segment. The processes up to this point are the same as in the past.

However, as a feature of the present embodiment, at the last end portion of the speed pattern, rather than dropping the displacement speed to zero, a displacement area (low speed displacement area L) of extremely low speed (such as 3 mm/sec) is set. The length (LL) of the low speed displacement area is defined at about 3 mm, for example. If the last segment of the measurement command Ci is less than 3 mm, the low speed displacement area is secured by sequentially retracing the previous segments. If the total length of the measurement command Ci is less than 3 mm, "the low speed displacement area" is not applied.

Therefore, when generating the individual speed plan corresponding to the measurement command Ci, the length LL of the low speed displacement area is subtracted from the last portion of the measurement command Ci and the speed pattern for the remainder is generated having an initial speed at 0 mm/sec and a final speed at 3 mm/sec. The last portion is constantly maintained at 3 mm/sec in the low speed displacement area. The created speed pattern plan PVi is stored in a speed pattern storage portion 343 (ST370).

When the speed pattern plan for the measurement command Ci is generated, an (estimated) start time tsi and (estimated) end time tei to perform the measurement command Ci are automatically determined. For ease of the description that follows, based on the speed pattern plan PVi, the start time to perform the measurement command Ci is expressed by "tsi" and the end time is expressed by "tei".

Further, the number of segments included in one measurement command Ci is known, and therefore, the time required to generate the speed pattern plan corresponding to one measurement command is substantially constant. For ease of the description that follows, the time required to generate the speed pattern plan corresponding to one measurement command is expressed by a planning calculation time Tp. The planning calculation time Tp may be set at a net time required to generate the speed pattern plan, however, the planning calculation time Tp may be better set at around the 1.3 times the net time to allow a slight margin.

Returning to ST340 in FIG. 17, the value of the connection determination flag LF is "1" (ST340: YES). In other words, it is determined that "the in-progress measurement command Ci−1 and the following measurement command Ci can be connected." In this case, the speed pattern planner 341 creates a connecting speed plan.

Figure 19:
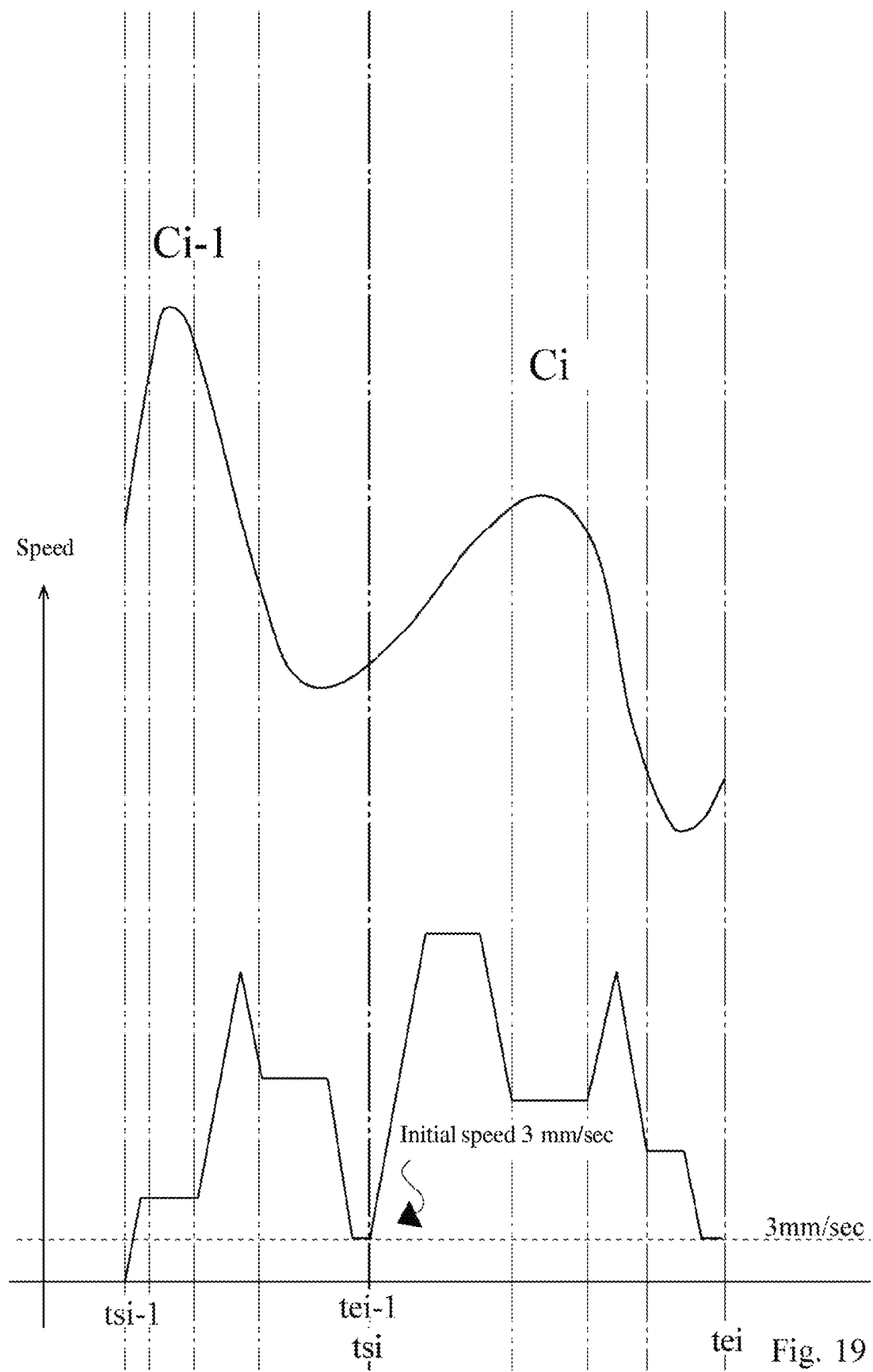
FIG. 19 illustrates an exemplary connecting speed plan.

The connecting speed plan only has one difference from the individual speed plan. When generating the connecting speed plan corresponding to the measurement command Ci, the initial speed is set at 3 mm/sec (see FIG. 19).

Even when the one-prior speed plan for the measurement command Ci is an individual speed plan or a connecting speed plan, the last portion of the speed plan should be at 3 mm/sec in the low speed displacement area. During the execution process of the measurement command Ci, when the initial speed of the probe is set at 3 mm/sec, the displacement speed of the probe is the same at the last portion of the one-prior measurement command Ci−1 and the first portion of the following measurement command Ci. Therefore, when the probe is displaced to the beginning of the measurement command Ci immediately after the last portion of the measurement command Ci−1, the probe 230 can be displaced continuously without stopping. When the connecting speed plan is created (in other words, the value of the connection determination flag LF is "1" (ST340: YES)), the probe can always be displaced to the beginning of the measurement command Ci after the last portion of the measurement command Ci−1. The reason for this is clearly described in the flow chart in FIG. 22.

The created speed pattern plan Pvi is stored in the speed pattern storage portion 343 (ST370).

At this point, when the connecting speed plan for the measurement command Ci is created, the (estimated) start time tsi and the (estimated) end time tei to perform the measurement command Ci are determined in the same way as in the individual speed plan. However, for the connecting speed plan, the starting time tsi to perform the measurement command Ci is the same as an end time tei−1 of the one-prior measurement command Ci−1.

Figure 20:
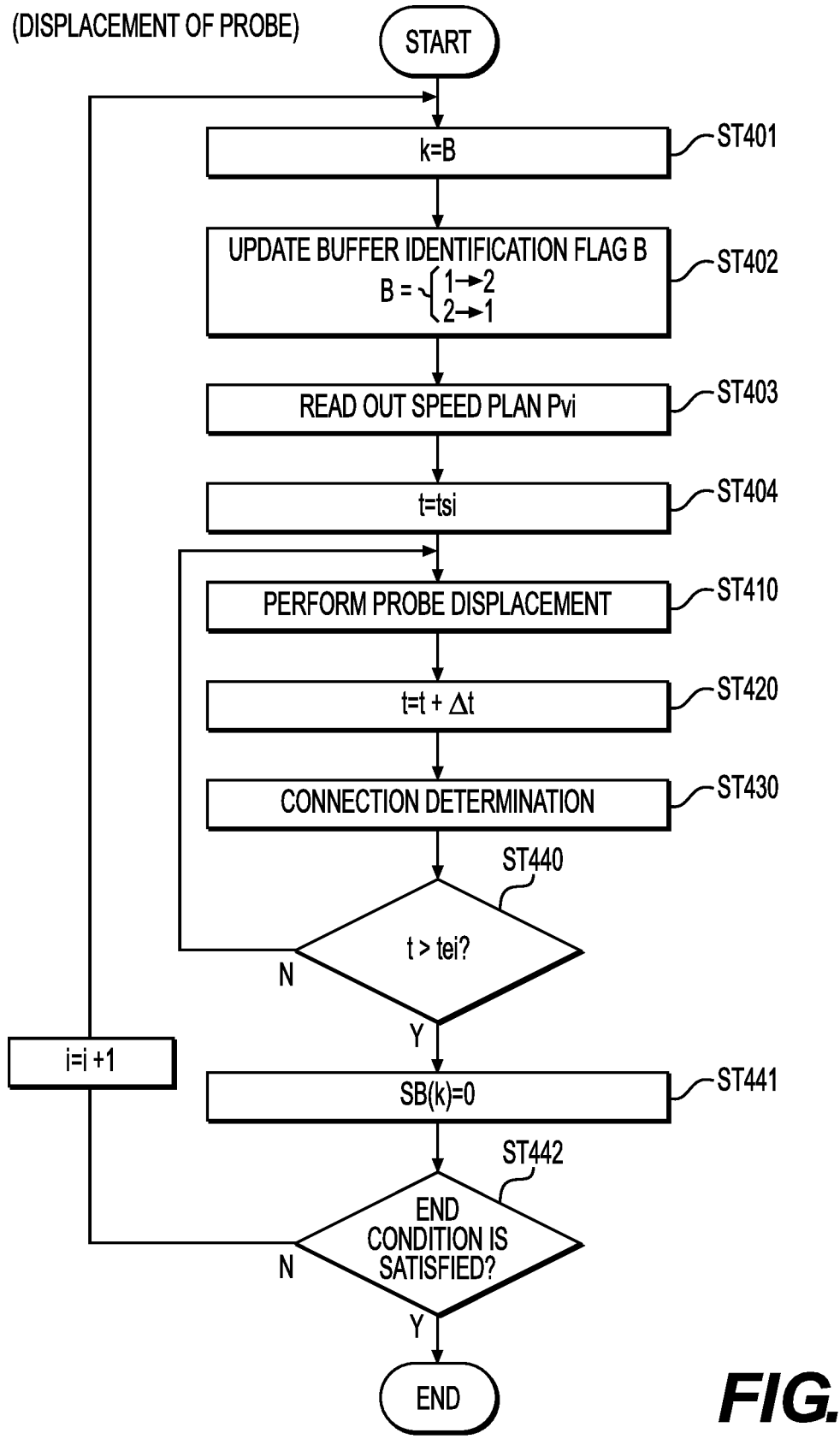
FIG. 20 is a flow chart illustrating a procedure of a probe performing scanning displacement based on the measurement command Ci and a speed pattern plan Pvi.
Figure 21:
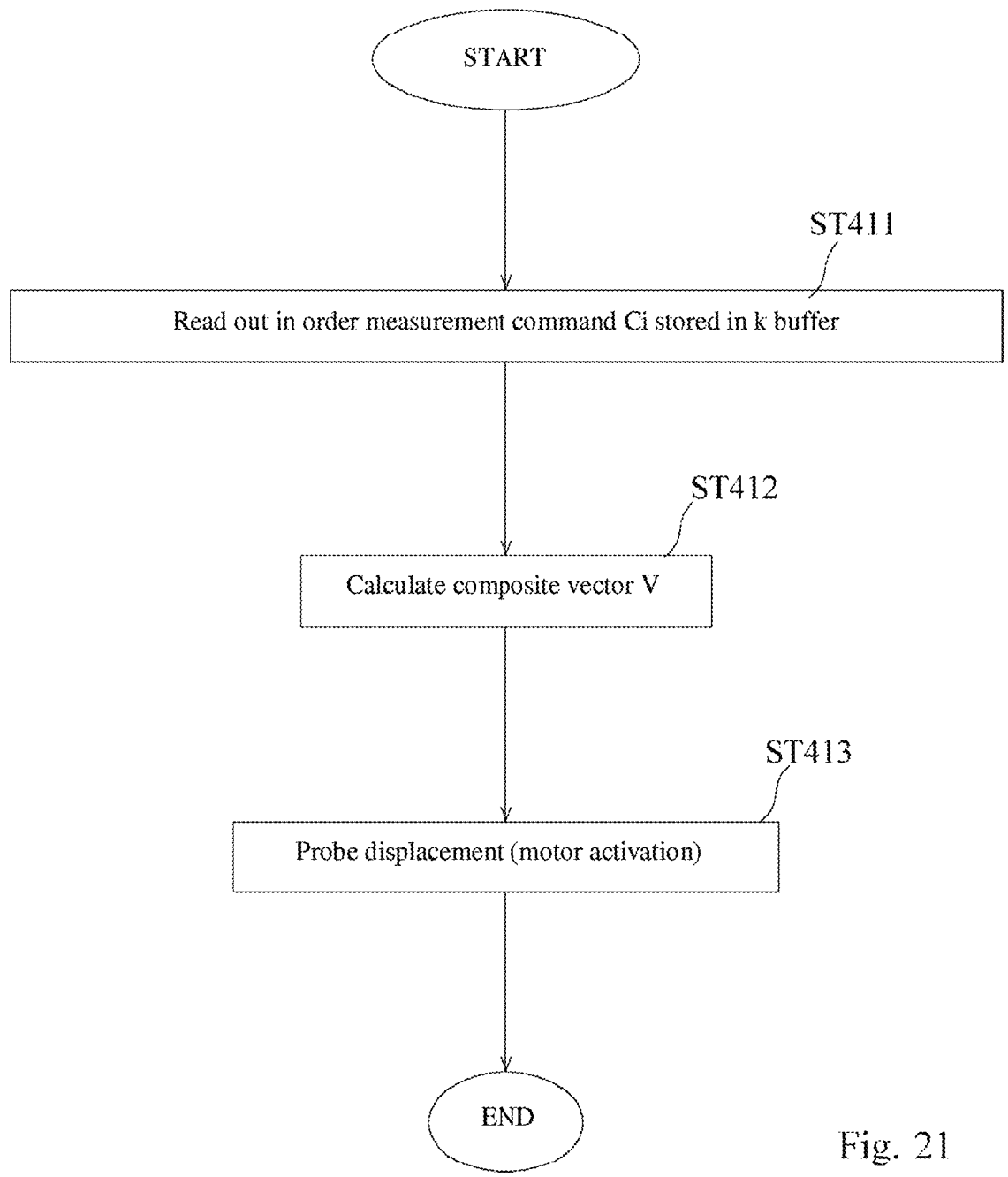
FIG. 21 is a flow chart illustrating a procedure of the probe performing scanning displacement based on the measurement command Ci and the speed pattern plan Pvi.
Figure 22:
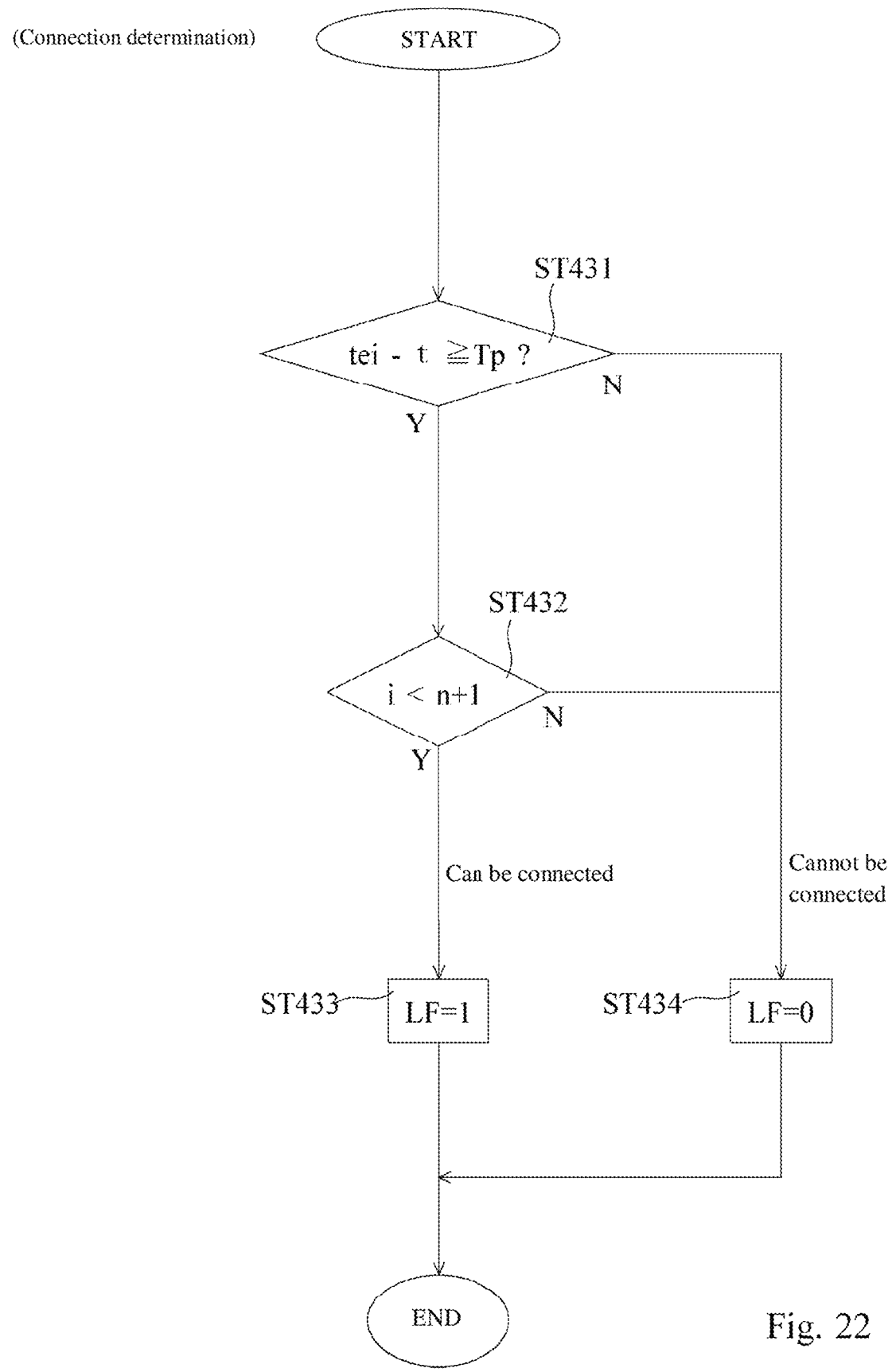
FIG. 22 is a flow chart illustrating a connection determination procedure.

Next, displacement control of the probe is described with reference to FIGS. 20 to 22. FIGS. 20 to 22 are flow charts illustrating a procedure of the probe 230 performing scanning displacement based on the measurement command Ci and the speed pattern plan Pvi. In addition, the buffer identification flag B and the buffer status flags SB(1) and SB(2) are also updated in association with the progress of the displacement control of the probe and the description thereof is provided in the flow charts. The control operations in FIGS. 20 to 22 are executed by the displacement command generator 340, and more specifically, through the cooperation of the CPU 348, the vector command generator 344, and the connection determiner 345 of the displacement command generator 340. The descriptions are given step by step.

After starting up, there is a short wait time, and the speed pattern plan corresponding to the initial measurement command C1 (FIG. 17) is already created by the initial starting time of the displacement control of the probe in FIG. 20. Thereafter, the operations may be processed according to the flow charts in FIGS. 20 to 22.

First, in ST401, the displacement command generator 340 extracts the value (1 or 2) of the current buffer identification flag B from the buffer flag information storage portion 312 and stores the value in a parameter k. When the value of the current buffer identification flag B is extracted in this way (ST401), the value of the buffer identification flag B is updated (ST402). In other words, the displacement command generator 340 accesses the buffer flag information storage portion 312 and updates the value of the buffer identification flag B (1→2 or 2→1).

The measurement command Ci stored in the buffer (1 or 2) which the displacement command generator 340 now accesses to perform the displacement control of the probe, is to be used after this, and therefore must not be overwritten with the measurement command Ci+1 from the host computer 500. At the same time, the buffer (2 or 1) which the displacement command generator 340 does not access is in a stand-by state. Therefore, the following measurement command Ci+1 is received by the buffer (2 or 1) in the stand-by state and the speed pattern can be generated by the speed pattern planner 341. Given this, the value of the buffer identification flag B is updated (1→2 or 2→1) and the following measurement command Ci+1 is received by the buffer in the stand-by state using the memory control operation (FIG. 16) noted above (ST213 and ST223).

The displacement command generator 340 reads out the speed plan Pvi stored in the speed pattern storage portion 343 (ST403). From this point, the measurement command Ci is processed in order from the beginning and the scanning displacement control of the probe 230 is performed. However, before starting, the execution starting time tsi of the measurement command Ci is entered in an internal time t of the time measurer 347 (ST404). Hereafter, the time measurer 347 adds a control cycle (Δt) to the internal time t every control cycle (ST420) and measures the time in real time during the execution of the measurement command Ci.

When the previous steps so far are completed, the displacement command generator 340 performs the scanning displacement control of the probe 230 based on the measurement command Ci (ST410). The composite vector V is generated by the vector command generator 344 and the drive controller 350 drives the motors or the like according to the composite vector V and displaces the probe 230. This is a well-known process. According to the flow chart in FIG. 21, the vector command generator 344 reads out, in order, the measurement command Ci stored in the k buffer (ST411) and calculates the composite vector V for the next interpolation point (ST412). The drive controller 350 controls activation of each motor according to the composite vector V and performs displacement of the probe 230 (ST413).

Returning to FIG. 20, the time measurer 347 updates the internal time t with every control cycle of the probe displacement (ST420) and the connection determiner 345 makes "a connection determination (ST430)" with reference to the newest internal time t. The connection determination (ST430) is described with reference to FIG. 22. The connection determiner 345 obtains the end time tei of the measurement command Ci from the speed plan Pvi of the measurement command Ci. Then, by comparing the internal time t of the time measurer 347 and the end time tei, a gap time (tei−t) from the current point in time until the end time (tei) of the measurement command Ci is found.

When the gap time (tei−t) continuously calculated in this way is longer than the planning calculation time Tp required for the speed planning process (ST431: YES), that means, in other words, that the speed plan for the following measurement command Ci+1 can be generated by the time the measurement command Ci currently in progress ends. Therefore, in this case, the value of the connection determination flag LF is set at "1" which means connectable.

When the value of the connection determination flag LF is set at"1," the speed pattern planner 341 is ready to read the connection determination flag LF (ST310 to ST330). In such a case, when generation of the following speed pattern begins at that point in time, the speed plan for the following measurement command Ci+1 can be generated by the time the measurement command Ci currently in progress ends.

When the generation of the speed pattern for the following measurement command Ci is completed, the process can shift to the following measurement command Ci+1 immediately after the measurement command Ci currently in progress is performed. In other words, this means that the measurement command Ci currently in progress and the following measurement command Ci+1 can be connected. Accordingly, the speed pattern planner 341 generates the connecting speed plan.

On the other hand, the process of the measurement command Ci advances and the gap time (tei−t) gradually shortens, and thus, the gap time becomes shorter than the planning calculation time Tp required for the speed planning process. Even when generation of the speed pattern for the following measurement command Ci+1 begins at that point in time, the speed plan for the following measurement command Ci+1 is not created by the time the measurement command Ci currently in progress ends and is not in time. Therefore, when the gap time (tei−t) is shorter than the planning calculation time Tp (ST431: NO), the value of the connection determination flag LF is updated to "0." When the value of the connection determination flag LF is set at"0," the speed pattern planner 341 proceeds to read the connection determination flag LF (ST310 to ST330), and the speed pattern planner 341 generates the individual speed plan.

Moreover, in ST432, "n+1" is a number of the measurement command (that is, the maximum value for i) and i reaching n+1 means that the measurement command Cn+1 is the last command and the final speed of the measurement command Cn+1 is set at 0. Therefore, the connection determination flag LF is set at 0 for convenience so that the individual speed plan is generated (ST432: NO).

Returning to FIG. 20, until the internal time t reaches tei, some portion of the measurement command Ci is still left, and therefore, the scanning displacement of the probe 230 according to the measurement command Ci is performed by running ST410 to ST440 in a loop.

When the internal time t reaches tei (ST440: YES), the process of the measurement command Ci ends. At this point in time, the measurement command in the k buffer, where the measurement command Ci was stored, completes execution, and therefore, the following measurement command Ci+2 may be further written to the k buffer. Given this, the value of the buffer status flag SB(k) of the k buffer is updated to "0."

When the value of the buffer status flag SB is updated to "0" (ST211 and ST221), as described in FIG. 16 as the memory control operation, the buffer is ready to receive (ST212 and ST222), and a new measurement command C is stored in the buffer (ST213, ST214, ST223, and ST224 in FIG. 16). Then, the buffer status flag SB(B) turns to "1" (ST310), and a new speed pattern plan is created (ST350 and ST360). Further description is redundant and is not repeated. However, it may be understood that by running the control loop to which each function is assigned, the probe displacement (ST410) is performed in sequence.

In ST410 in FIG. 20 (ST411 to ST413 in FIG. 21), the control operation to displace the probe 230 by the vector command and the motor control based on the vector command is similar to the conventional case. The importance of the present invention lies elsewhere, that is, in (finely) dividing the PCC curve, in dividing the buffer, in the memory control, in the speed pattern plan, and the like, and ST410 itself is performed conventionally. However, the nature of the probe displacement obtained in ST410 is different from the conventional case.

Conventionally, when the PCC curve (the path for scanning measurement) is long or the PCC curve includes a complicated curvature change, an amount of information in the measurement command C exceeds the buffer capacity. As a result, the probe 230 naturally pauses in the middle of the continuous measurement path to perform retraction and approach. This has been a big negative factor for measurement efficiency and subsequent data processing.

In this respect, in the present embodiment, the PCC curve is intentionally divided into a relatively small number of segments, and the buffer is also divided into two. By using the buffers alternately, even when the measurement command itself is divided, the operation of the probe displacement is continuous rather than split up. In other words, the following measurement command Ci+1 is received by a buffer while the measurement command Ci is in progress, and the following speed pattern plan (connecting speed plan) is created. After that, the measurement command Ci+1 is connected after the measurement command Ci.

However, there is no guarantee that the following speed pattern plan (connecting speed plan) is created in time. In the present embodiment, for the speed pattern plan, the low speed displacement area L is provided at the end portion of each measurement command and the displacement speed of the probe 230 is dropped to an extremely low speed (such as 3 mm/sec). Even if the following speed pattern plan (connecting speed plan) is not created in time, the speed is sufficiently dropped (deceleration is completed before the low speed displacement area L), and therefore, the motor may be stopped and then the retraction and the like may be performed.

In this example, even though the measurement command Ci and the following measurement command Ci+1 can be connected, dropping to low speed (for example 3 mm/sec) each time at a connection portion may seem to be slightly negative in respect of time efficiency. Ideally, taking the last segment of the measurement command Ci and the beginning segment of the following measurement command Ci+1 together, calculating the optimal speed using the end of the measurement command Ci and the beginning of the measurement command Ci+1 and passing through the connection portion at the optimal speed may be better. Although this may be possible using a ring buffer, currently, when generating the speed pattern plan segments cannot be processed little by little and a speed pattern plan is created for every given section grouping (each measurement command Ci). To calculate the optimal speed of the portion connecting the end of the measurement command Ci and the beginning of the measurement command Ci+1 every time, an extensive change is required in a generation method of the speed pattern. In addition, when the calculation is not finished in time, the probe 230 needs to be paused and the retraction and approach have to be inserted. However, in this case, processing the break in the data with later data processing is likely to be difficult. (The place where the probe 230 stopped may be found by tracking a memory address, however, the process is likely to be quite complicated.) In consideration of the circumstances above, in the present embodiment, the buffer is divided and the probe passes at the predetermined low speed (no pausing) through the connection portions between the divided measurement commands. In fact, in the present embodiment, the speed plan of the following measurement command Ci+1 is created while the measurement command Ci is in progress. Therefore, even if the low speed area always appears, it is obvious that the measurement time can be considerably shortened compared to the conventional method, and later data processing can be performed simply and at high speed as the probe does not pause.

Moreover, the present invention is not limited to the embodiment described above, and may be modified as needed without departing from the scope of the present invention. In the above-noted embodiment, active nominal scanning measurement is given as an example, however, passive nominal scanning measurement may of course be used instead.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A control method of a shape measuring apparatus having a probe with a stylus tip at a distal end, and further having a displacement mechanism that displaces the probe, the apparatus detecting contact between the stylus tip and a surface of a work piece and measuring a shape of the work piece, the method comprising:

based on design data of the work piece:
locating, via a host computer, a scanning path over which to displace the stylus tip; and
receiving a command from the host computer to a motion controller; and
based on the received command from the host computer, displacing, via the motion controller, the stylus tip along the scanning path while controlling a deflection amount of the probe toward the work piece to remain at a standard deflection amount, during which the following processes are executed by the motion controller:
dividing the scanning path after every predetermined number of segments, and defining a set of measurement commands $C_i$, where i is an integer from 1 to n+1 and n is an integer greater than or equal to one, for each of the predetermined number of segments;
averaging the number of segments included in the measurement command $C_n$ and the number of segments included in the measurement command $C_{n+1}$;
creating a speed pattern plan for the following measurement command $C_{i+1}$, while executing the measurement command $C_i$;
thereafter performing planning such that a final speed of a speed pattern plan $P_{vi}$ of the measurement command $C_i$ is the same as an initial speed of a speed pattern plan $P_{vi+1}$ of the measurement command $C_{i+1}$;

connecting the end of the measurement command Ci and the beginning of the measurement command Ci+1; and displacing the probe without stopping, wherein the final speed of the speed pattern plan Pvi of the measurement command Ci and the initial speed of the speed pattern plan Pvi+1 of the measurement command Ci+1 are not 0 mm/sec.

2. The control method of the shape measuring apparatus according to claim 1, further comprising:

setting, via the motion controller, the final speed of the speed pattern plan Pvi of the measurement command Ci at a low speed of 1 mm/sec to 5 mm/sec.

3. The control method of the shape measuring apparatus according to claim 2, wherein when a time required to generate the speed pattern plan corresponding to one measurement command Ci is designated as a planning calculation time Tp:

continuously calculating a gap time, from a current time to an estimated end time of the one measurement command Ci, while executing the measurement command Ci;

generating a connecting speed plan to keep the initial speed of the speed pattern plan Pvi+1 of the measurement command Ci+1 the same as the final speed of the speed pattern plan Pvi of the measurement command Ci, when the gap time is longer than the planning calculation time Tp; and creating an individual speed plan to keep the initial speed of the speed pattern plan Pvi+1 of the measurement command Ci+1 at zero, when the gap time is shorter than the planning calculation time Tp.

4. The control method of the shape measuring apparatus according to claim 1, wherein when a time required to generate the speed pattern plan corresponding to one measurement command Ci is designated as a planning calculation time Tp:

continuously calculating a gap time, from a current time to an estimated end time of the one measurement command Ci, while executing the measurement command Ci;

generating a connecting speed plan to keep the initial speed of the speed pattern plan Pvi+1 of the measurement command Ci+1 the same as the final speed of the speed pattern plan Pvi of the measurement command Ci, when the gap time is longer than the planning calculation time Tp; and creating an individual speed plan to keep the initial speed of the speed pattern plan Pvi+1 of the measurement command Ci+1 at zero, when the gap time is shorter than the planning calculation time Tp.

* * * * *